(12) United States Patent
Hashimoto

(10) Patent No.: US 6,332,843 B1
(45) Date of Patent: Dec. 25, 2001

(54) DAMPER DISK ASSEMBLY

(75) Inventor: Yasuyuki Hashimoto, Neyagawa (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/479,222

(22) Filed: Jan. 7, 2000

(30) Foreign Application Priority Data

Jan. 19, 1999 (JP) .................................................. 11-10130

(51) Int. Cl.[7] .................................................. F16D 3/12
(52) U.S. Cl. .................. 464/68; 464/66; 464/64; 464/62; 192/205; 192/211; 192/212; 192/213
(58) Field of Search .................. 464/62, 64, 68, 464/66; 192/205, 212, 211, 213; 267/168, 169

(56) References Cited

U.S. PATENT DOCUMENTS

| 4,351,168 | * | 9/1982 | Prince et al. | 464/64 |
| 5,657,845 | * | 8/1997 | Szadkowski et al. | 192/205 |
| 5,803,442 | * | 9/1998 | Despres et al. | 464/68 |
| 5,823,516 | | 10/1998 | Despres | 267/168 |
| 5,908,100 | * | 6/1999 | Szadkowski et al. | 464/68 |

FOREIGN PATENT DOCUMENTS

| 19611507 | 10/1996 | (DE) . |
| 2732425 | 4/1996 | (FR) . |
| 2732426 | 4/1996 | (FR) . |
| 545257 | 6/1993 | (JP) . |
| 842591 | 2/1996 | (JP) . |
| 842592 | 2/1996 | (JP) . |
| 842593 | 2/1996 | (JP) . |
| 9229138 | 9/1997 | (JP) . |

* cited by examiner

Primary Examiner—Lynne H. Browne
Assistant Examiner—Aaron Dunwoody
(74) Attorney, Agent, or Firm—Shinjyu Global IP Conselors, LLP

(57) ABSTRACT

A damper disk assembly is provided for use in a clutch device. The damper disk assembly has a pair of plates 5 and 6 (rotary member) elastically coupled to the hub flange 8 (rotary member) by a damper mechanism 4. The damper mechanism 4 is designed to reduce disadvantages due to nonparallel compression of an elastic member in the damper disk assembly. The damper mechanism 4 includes a plurality of coil spring assemblies 13. The coil spring assemblies 13 have a large coil spring 30, a small coil spring 31 and a pair of spring seats 34. The paired spring seats 34 are arranged on the circumferentially opposite ends of the small coil spring 31. The spring seats 34 support the circumferentially opposite ends of the small coil spring 31, and are engaged with the inner side of the small coil spring 31. The spring seats 34 are supported for rotation with respect to two kinds of rotary members around a shaft parallel to a rotation axis of the rotary members.

36 Claims, 16 Drawing Sheets

DAMPER DISK ASSEMBLY

BACKGROUND OF THE INVENTION

1. Field of the Invention

The invention generally relates to a damper disk assembly. More specifically, the present invention relates a damper disk assembly for absorbing and damping torsional vibrations in a power transmission system.

2. Background Information

A damper disk assembly often used in a clutch disk assembly of an automobile. The damper disk assembly is formed of an input member, an output member and a damper mechanism. The input member can be coupled to an input flywheel. The output member can be coupled to a shaft extending from a transmission. The damper mechanism elastically couples the input and output members together in a rotating direction. The input member is typically formed of a pair of friction facings and a pair of input plates which are arranged radially inside the friction facings. The friction facings are fixedly coupled to one of the input plates. The output member is typically in the form of a hub that is nonrotatably coupled to the shaft of the transmission. The hub has a centrally located boss with a splined bore, and a radial flange extending outwardly from the boss. The splined bore of the boss is spline-engaged with the shaft of the transmission. The radial flange extends from the boss and is elastically coupled to the input plates by the damper mechanism. The damper mechanism is formed of springs which elastically couple the pair of input plates to the flange of the hub in the rotating direction, and a friction generating mechanism for generating friction between the pair of input plates and the flange. When the pair of input plates rotates relatively to the hub, the springs are compressed in the rotating direction so that sliding occurs in the friction generating mechanism. As a result, torsional vibrations in the rotating direction are absorbed and dampened.

The flange of the hub is provided with windows (spring accommodating apertures) for receiving the springs therein. The paired input plates are provided with spring support portions (spring accommodating portions) for supporting the springs. Each window supports the circumferentially opposite ends and radially opposite ends of the spring. The spring support portions support the circumferentially opposite ends, radially opposite ends and axially opposite ends of the spring. When the input plate pair rotates relatively to the flange, each spring is compressed between one end surface on one circumferential side of the window and one end surface on the other circumferential side of the spring support portions. In this compressing operation, each of the end surfaces on circumferential opposite sides of the window and the spring support portions move such that the radially outer portions of these surfaces move a distance that is circumferentially longer than the radially inner portions of these surfaces. Therefore, each spring has such a form that the radially outer portion (i.e., the outer portion in the radial direction of the disk) has a circumferential length or width shorter than that of the radially inner portion. When the spring is compressed in a nonparallel fashion as described above, the spring is subjected to a bending force in addition to a shearing force, resulting in a reduced lifetime.

An elastic float arranged within a coil spring has been known as a kind of spring arrangement within the window and the support portion. The elastic float is, for example, a cylindrical or columnar member having a rubber member with hard resin members arranged on the opposite sides of the rubber member, respectively. The elastic float can freely move in predetermined angles between circumferentially opposite ends of the window and spring support portion when the damper disk assembly is in a free state. The elastic float is compressed between the end on circumferentially one side of the window and the end on the circumferentially other side of the spring support portion after the coil spring is compressed to a certain extent. Consequently, the rigidity of the damper mechanism rapidly increases. In this manner, the elastic float achieves a stop torque in the damper disk assembly.

However, when the coil spring is compressed in the nonparallel fashion as already described in connection with the prior art, the elastic float inclines due to the coil spring. Thus, the elastic float is compressed so that a situation can occur in that the end surface of the elastic float is only in partial contact with the other member (the end surface of the plate member or the spring seat). In this case, the elastic float cannot generate a sufficiently large load, and therefore, a desired stop torque cannot be obtained.

In view of the above, there exists a need for a damper disk assembly which overcomes the above mentioned problems in the prior art. This invention addresses this need in the prior art as well as other needs, which will become apparent to those skilled in the art from this disclosure.

SUMMARY OF THE INVENTION

An object of the invention is to suppress disadvantages, which can be caused by nonparallel compression of the elastic member in the damper disk assembly.

According to a first aspect of the present invention, a damper disk assembly includes a first rotary member, a second rotary member, a coil spring, a pair of spring seats and an elastic member. The first rotary member is a plate-like member provided with a spring accommodating aperture. The second rotary member is a plate-like member provided with a spring accommodating portion corresponding to the spring accommodating aperture, and is arranged near the first rotary member. The coil spring is arranged within the spring accommodating aperture and the spring accommodating portion for transmitting a torque between the first and second rotary members. The paired spring seats are arranged on the circumferentially opposite ends of the coil spring, respectively. The spring seats support the circumferentially opposite ends of the coil spring, respectively. The spring seats also engage with an inner side of the coil spring. Furthermore the spring seats are circumferentially engageable with the circumferentially opposite ends of the spring accommodating aperture and the spring accommodating portion. The elastic member is arranged within the coil spring. The elastic member is compressed between the paired spring seats when the paired spring seats move toward each other in accordance with relative rotation between the first and second rotary members. The paired spring seats are supported by the circumferentially opposite ends of the spring accommodating aperture and the spring accommodating portion for rotation around an axis parallel to a rotation axis of the first and second rotary members.

According to the damper disk assembly of the first aspect of the present invention, when torque is supplied, e.g., to the second rotary member, the torque is transmitted to the first rotary member via the coil spring. When the first and second rotary members rotate relatively to each other due to variations in torque, the coil spring is compressed to absorb and damp the torsional vibrations. More specifically, the coil spring is compressed between the end on one circumferential side of the window and the end on the other circumferential side of the spring support portion.

When the coil spring is compressed, the spring seats are rotatably supported by the circumferentially opposite ends of the spring accommodating aperture and spring accommodating portion so that the spring seats are rotated or inclined by the load applied from the coil spring. Therefore, the coil spring is compressed in a more parallel fashion than in the prior art. As a result, the position or attitude of the elastic member is determined by the coil spring, and is compressed between the paired spring seats in a more parallel fashion than in the prior art. Thus, the elastic member can apply a sufficiently large load.

According to a second aspect of the present invention, a damper disk assembly includes a first rotary member, a second rotary member, a coil spring and a pair of spring seats. The first rotary member is a plate-like member provided with a spring accommodating aperture. The second rotary member is a plate-like member provided with a spring accommodating portion corresponding to the spring accommodating aperture, and is arranged near the first rotary member. The coil spring is arranged within the spring accommodating aperture and the spring accommodating portion for transmitting a torque between the first and second rotary members. The paired spring seats are arranged on the circumferentially opposite ends of the coil spring, respectively. The paired spring seats support the circumferentially opposite ends of the coil spring, respectively. The paired spring seats engage with an inner side of the coil spring and are circumferentially engageable with the circumferentially opposite ends of the spring accommodating aperture and the spring accommodating portion. The paired spring seats have contact portions. The contact portions extend within the coil spring, and come into contact with each other when the paired spring seats move toward each other in accordance with the relative rotation between the first and second rotary members. The paired spring seats are supported by the circumferentially opposite ends of the spring accommodating aperture and the spring accommodating portion for rotation around an axis parallel to a rotation axis of the first and second rotary members.

According to the damper disk assembly of the second aspect of the present invention, when the coil spring is compressed, the spring seats are rotatably supported by the circumferentially opposite ends of the spring accommodating aperture and spring accommodating portion so that the spring seats are rotated or inclined by the load applied from the coil spring. Therefore, the coil spring is compressed in a more parallel fashion than in the prior art. As a result, the positions or attitudes of the paired spring seats are determined by the coil spring, and are kept in the contacted and compressed state in a more parallel fashion than in the prior art. Thus, the paired spring seats can apply a sufficiently large load.

According to a third aspect of the present invention, a damper disk assembly includes a first rotary member, a second rotary member, a first coil spring, a second coil spring and a pair of spring seats. The first rotary member is a plate-like member provided with a spring accommodating aperture. The second rotary member is a plate-like member provided with a spring accommodating portion corresponding to the spring accommodating aperture, and is arranged near the first rotary member. The first coil spring is arranged within the spring accommodating aperture and the spring accommodating portion. The first coil spring is supported between the circumferentially opposite ends of the spring accommodating aperture and the spring accommodating portion for transmitting a torque between the first and second rotary members. The second coil spring is arranged within the spring accommodating aperture and the spring accommodating portion, and is located within the first coil spring for transmitting the torque between the first and second rotary members. The paired spring seats are arranged on the circumferentially opposite ends of the second coil spring, respectively. The paired spring seats support the circumferentially opposite ends of the second coil spring, respectively and engage with an inner side of the second coil spring. The paired spring seats are circumferentially engageable with the circumferentially opposite ends of the spring accommodating aperture and the spring accommodating portion. The paired spring seats are supported by the circumferentially opposite ends of the spring accommodating aperture and the spring accommodating portion for rotation around an axis parallel to a rotation axis of the first and second rotary members.

According to the damper disk assembly of the third aspect of the present invention, when the torque is supplied, e.g., to the second rotary member, the torque is transmitted to the first rotary member via the first and second coil springs. When the first and second rotary members rotate relatively to each other due to variations in torque, the first and second coil springs are compressed between them in a parallel fashion to absorb and damp the torsional vibrations. More specifically, the first coil spring is compressed between the end on circumferentially one side of the spring accommodating aperture and the end on the circumferentially other side of the spring support portion. The second coil spring is compressed via the spring seats between the end on circumferentially one side of the spring accommodating aperture and the end on the circumferentially other side of the spring support portion. Since the spring seats are rotatably supported by the circumferentially opposite ends of the spring accommodating aperture and spring accommodating portion, the spring seats are rotated or inclined by the load applied from the second coil spring. Therefore, the second coil spring is compressed in a more parallel fashion than in the prior art. In the preceding structure, since the paired spring seats receive the load only from the second coil spring, the paired spring seats rotate smoothly.

According to a fourth aspect of the present invention, the damper disk assembly of the first, second or third aspect further has such a feature that the circumferentially opposite ends of the spring accommodating aperture and the spring accommodating portion are provided with arc-shaped concave portions opened in the circumferential direction. The spring seat has an engagement portion engageable with the concave portions.

According to a fifth aspect of the present invention, the damper disk assembly of the third aspect further has such a feature that the circumferentially opposite ends of the spring accommodating aperture and the spring accommodating portion have first supports and second supports. The first supports support the circumferentially opposite ends of the first coil spring. The second supports support the spring seats.

According to a sixth aspect of the present invention, the damper disk assembly of the fifth aspect further has such a feature that the second support is an arc-shaped concave portion opened in the circumferential direction. Furthermore, the spring seat has an engagement portion engageable with the concave portion.

According to a seventh aspect of the present invention, the damper disk assembly of the fifth or sixth aspect of the present invention further has such a feature that a first space is maintained circumferentially between the spring seat and each of the circumferentially opposite ends of the first coil spring.

According to the damper disk assembly of the seventh aspect of the present invention, the circumferentially opposite ends of the first coil spring are restrained from contact with the spring seats. Therefore, the first coil spring does not apply a load to the spring seats so that the spring seat is not pressed strongly against the spring accommodating aperture and the spring accommodating portion.

According to an eighth aspect of the present invention, the damper disk assembly of the fifth, sixth or seventh aspect further has such a feature that a second space is maintained circumferentially between the first support and each of the circumferentially opposite ends of the second coil spring.

According to the damper disk assembly of the eighth aspect of the present invention, the second coil spring is supported by the circumferentially opposite ends of the spring accommodating aperture and the spring accommodating portion only via the spring seats. Since the second coil spring does not come into contact with the spring accommodating aperture and the spring accommodating portion, the second coil spring applies a sufficient load to the spring seats.

According to a ninth aspect of the present invention, a damper disk assembly includes a first rotary member, second rotary members, a first coil spring, a second coil spring and a pair of spring seats. The first rotary member is a circular plate member provided with a spring accommodating aperture. The second rotary members are a pair of plate members provided with spring accommodating portions corresponding to the spring accommodating aperture, arranged on the axially opposite sides of the first rotary member and fixedly coupled together. The first coil spring is arranged within the spring accommodating aperture and the spring accommodating portion. The first coil spring is supported between the circumferentially opposite ends of the spring accommodating aperture and the spring accommodating portion for transmitting a torque between the first and second rotary members. The second coil spring is arranged within the spring accommodating aperture and the spring accommodating portion, and is located within the first coil spring for transmitting the torque between the first and second rotary members. The paired spring seats are arranged on the circumferentially opposite ends of the second coil spring, respectively. The paired spring seats support the circumferentially opposite ends of the second coil spring, respectively, and engage with an inner side of the second coil spring. The paired spring seats are circumferentially engageable with the circumferentially opposite ends of the spring accommodating aperture and the spring accommodating portion. The paired spring seats are supported by the circumferentially opposite ends of the spring accommodating aperture and the spring accommodating portion for rotation around an axis parallel to a rotation axis of the first and second rotary members.

According to the damper disk assembly of the ninth aspect of the present invention, when the torque is supplied, e.g., to the second rotary member, the torque is transmitted to the first rotary member via the first and second coil springs. When the first and second rotary members rotate relatively to each other due to variations in torque, the first and second coil springs are compressed between them in a parallel fashion to absorb and damp the torsional vibrations. More specifically, the first coil spring is compressed between the end on circumferentially one side of the spring accommodating aperture and the end on the circumferentially other side of the spring support portion. The second coil spring is compressed via the spring seats between the end on circumferentially one side of the spring accommodating aperture and the end on the circumferentially other side of the spring support portion. Since the spring seats are rotatably supported by the circumferentially opposite ends of the spring accommodating aperture and spring accommodating portion, the spring seats are rotated or inclined by the load applied from the second coil spring. Therefore, the second coil spring is compressed in a more parallel fashion than in the prior art. In the above structure, since the paired spring seats receive the load only from the second coil spring, the paired spring seats rotate smoothly.

According to a tenth aspect of the present invention, the damper disk assembly of the ninth aspect further has such a feature that the spring seat has an axial length longer than its radial length.

According to the damper disk assembly of the tenth aspect of the present invention, a portion of the spring seat opposed to the circumferential end of the first coil spring is small. Therefore, contact between the first coil spring and the spring seat is suppressed. As a result, application of the load from the first coil spring to the spring seat is suppressed so that the spring seat is not pressed strongly against the spring accommodating aperture or the spring accommodating portion.

According to an eleventh aspect of the present invention, the damper disk assembly of the tenth aspect further has such a feature that each of the circumferentially opposite ends of the spring accommodating aperture and the spring accommodating portion has a pair of first supports and a second support. The first supports are aligned in the radial direction for contact with the circumferential end of the first coil spring. The second support is formed radially between the paired first supports, and supports the spring seat.

According to an twelfth aspect of the present invention, the damper disk assembly of the eleventh aspect further has such a feature that the second support is an arc-shaped concave portion opened in the circumferential direction. The spring seat has an engagement portion engageable with the concave portion.

According to a thirteenth aspect of the present invention, the damper disk assembly of any one of the ninth to twelfth aspects further has such a feature that the spring seat is provided at its axially opposite ends with opposition surfaces. The opposition surfaces are opposed to the circumferential end of the first coil spring. First spaces are maintained circumferentially between the circumferentially opposite ends of the first coil spring and the opposition surfaces, respectively.

According to the damper disk assembly of the thirteenth aspect of the present invention, the circumferentially opposite ends of the first coil spring are restrained from contact with the opposition surfaces of the spring seat. Therefore, the first coil spring hardly applies a load to the spring seat so that the spring seat is not pressed strongly against the spring support portions and the spring accommodating portion.

According to a fourteenth aspect of the present invention, the damper disk assembly of the thirteenth aspect further has such a feature that the opposition surface has radially opposite sides located circumferentially outward with respect to its radially middle portion. According to this structure, the contact between the opposition surface and the first coil spring is suppressed even when the spring seat rotates relatively to the first and second rotary members.

According to a fifteenth aspect of the present invention, the damper disk assembly of any one of the eleventh to fourteenth aspects further has such a feature that second spaces are maintained circumferentially between the first support portions and the circumferentially opposite ends of the second coil spring, respectively.

According to the damper disk assembly of the fifteenth aspect of the present invention, the second coil spring is supported by the circumferentially opposite ends of the spring accommodating aperture and the spring accommodating portion only through the spring seats. Since the circumferentially opposite ends of the second coil spring are restrained from contact with the first supports, the second coil spring can apply a sufficient load to the spring seats.

According to a sixteenth aspect of the present invention, the damper disk assembly of any one of the ninth to fifteenth aspects further has such a feature that the spring seat has a restraint portion restrained from an axial movement when engaged with the circumferential end of one of the spring accommodating aperture and the spring accommodating portion.

According to the damper disk assembly of the sixteenth aspect of the present invention, the spring seat is always restrained from the axial movement by at least one of the spring accommodating apertures and the spring accommodating portion.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
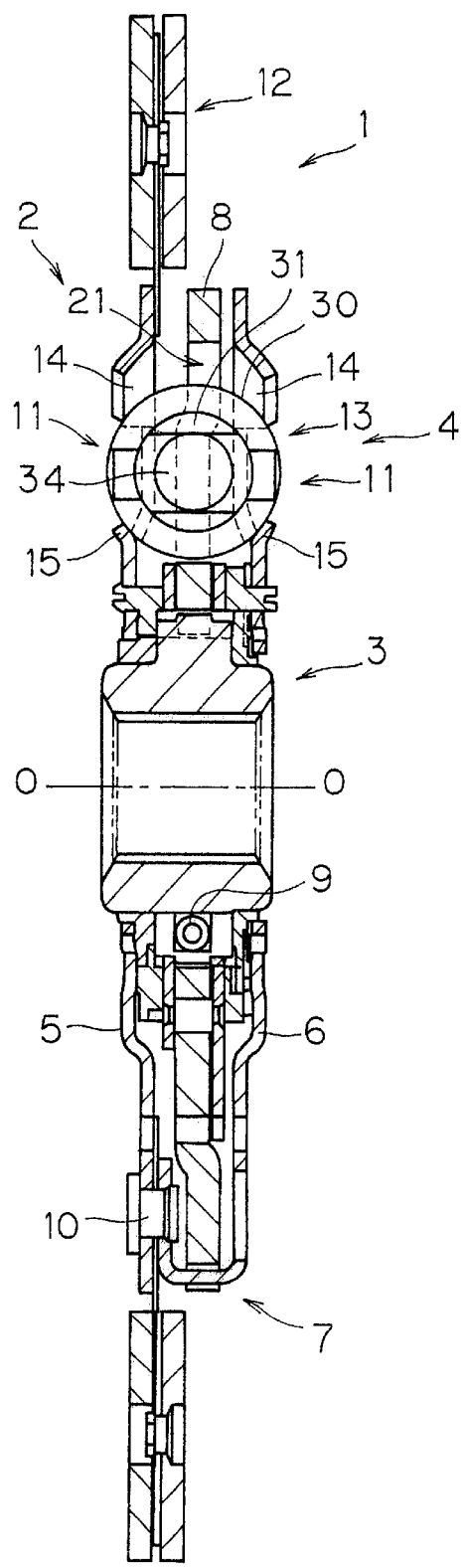
FIG. 1 is a schematic cross sectional view of a clutch disk assembly in accordance with a first embodiment of the present invention.
Figure 2:
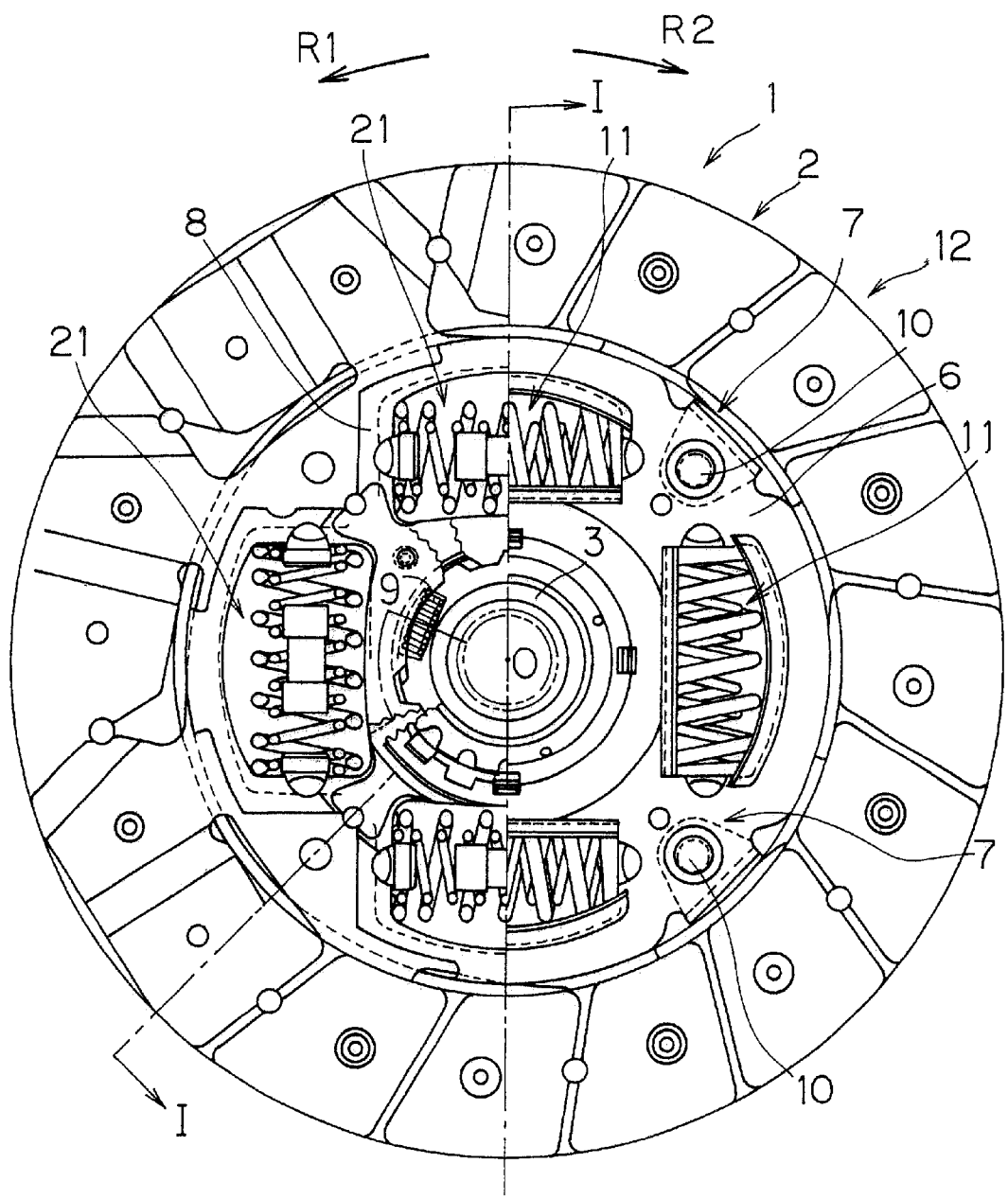
FIG. 2 is a side elevational view of the clutch disk assembly illustrated in FIG. 1 with certain portions removed for purposes of illustration.

Referring initially to FIG. 1, a cross sectional view of a clutch disk assembly 1 (damper disk assembly) is illustrated in accordance with one embodiment of the invention. FIG. 2 is an elevational view of the clutch disk assembly 1. The clutch disk assembly 1 is a power transmission device used in a clutch device of an automobile, and has a clutch function and a damper function.

The clutch disk assembly 1 is basically formed of an input rotary member 2, a spline hub 3 and a damper mechanism 4 arranged between the input rotary member 2 and the spline hub 3. The clutch function is performed by the input rotary member 2 which are selectively transmitting and intercepting a torque by engaging or disengaging a flywheel (not shown). The damper mechanism 4 performs the function of absorbing and damping torque vibrations transmitted from the flywheel side via springs.

In FIG. 1, centerline O—O represents a rotation axis of the clutch disk assembly 1. In FIG. 1, an engine and a flywheel (both not shown) are arranged on the left side, and a transmission (not shown) is arranged on the right side. In FIG. 2, an arrow R1 indicates a drive side (positive side) in the rotating direction of the clutch disk assembly 1, and an arrow R2 represents the opposite (negative) side.

The input rotary member 2 is a member for receiving a torque from the flywheel (not shown). The input rotary member 2 is basically formed of a clutch plate 5, a retaining plate 6 and a clutch disk 12. The clutch plate 5 and the retaining plate 6 are coupled together to form a second rotary member. The clutch plate 5 and the retaining plate 6 are preferably circular or annular pressed sheets that are formed by conventional sheet metal working methods. The clutch plate 5 and the retaining plate 6 are axially spaced from each other by a predetermined distance with the damper mechanism 4 coupled between the clutch plate 5 and the retaining plate 6. The clutch plate 5 is arranged on the engine side, while the retaining plate 6 is arranged on the transmission side. The clutch and retaining plates 5 and 6 are fixedly coupled together by plate-like coupling portions 7 so that they can rotate together while keeping a constant axial space. In the illustrated embodiment, the coupling portions 7 are preferably integrally formed together with the retaining plate 6 as a one-piece, unitary member. The clutch plate 5 is fixedly coupled to the coupling portions 7 of the retaining plate 6 by fasteners 10 such as rivets.

The clutch disk 12 can be pressed against the flywheel (not shown) for engagement therewith in a conventional manner. The clutch disk 12 is formed of a cushioning plate located between a pair of friction facings. The clutch disk 12 is fixedly coupled to the outer peripheral portions of the clutch and retaining plates 5 and 6 in a conventional manner, such as rivets 10.

The clutch and retaining plates 5 and 6 are provided with central apertures, respectively. The spline hub 3 is arranged in these central apertures. The spline hub 3 is spline-engaged with a shaft extending from the transmission (not shown). A hub flange 8 (first rotary member) is arranged around the spline hub 3 and is located axially between the plates 5 and 6. The hub flange 8 is a circular plate member having a central aperture. The hub flange 8 is coupled in the rotating direction to the spline hub 3 by coil springs 9 in a conventional manner to permit limited rotation therebetween.

Figure 3:
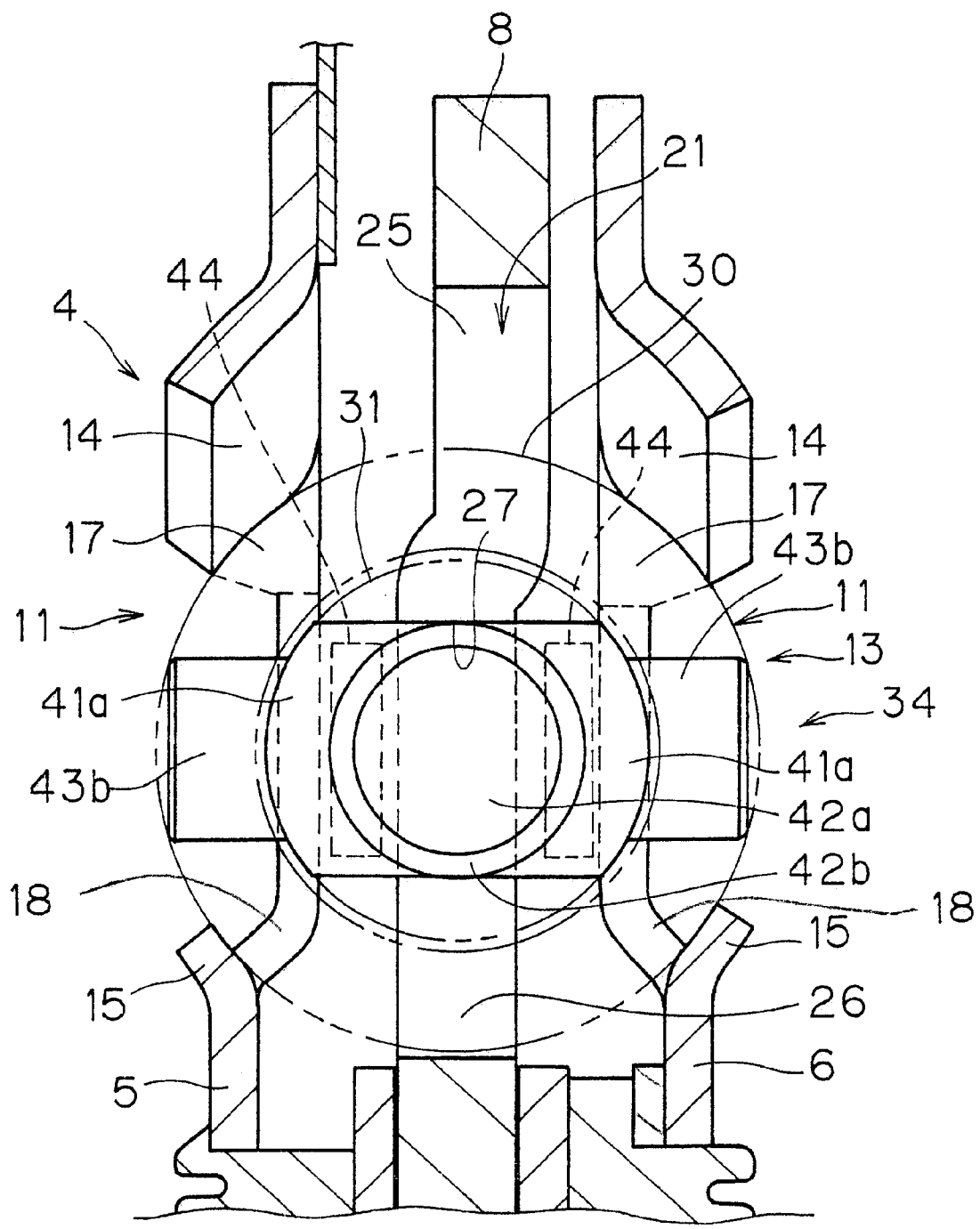
FIG. 3 is an enlarged, fragmentary cross sectional view of the clutch disk assembly illustrated in FIGS. 1 and 2 showing the interconnection between the clutch plate, the retaining plate and the hub flange via one of the coil spring assembly.

As best seen in FIG. 3, each of the clutch and retaining plates 5 and 6 is provided at its radially outer portion with four spring support portions 11 (spring accommodating portions) which are equally spaced from each other in the rotating direction. Each spring support portion 11 is formed of an axial through-hole. The position and configuration of the spring support portion 11 correspond to those of the windows 21. Each spring support portion 11 is provided with a radially outer cover portion 14 and a radially inner cover portion 15. Each radially outer cover portion 14 is a bent portion formed by conventional pressing techniques, and is provided for restricting the axially and radially outer movements of the coil spring assembly 13. Each radially inner cover portion 15 is formed by partially cutting and bending a portion of the plate body, and is provided for restricting the axially and radially inner movements of the coil spring assembly 13. The circumferentially opposite ends of the radially inner cover portions 15 are cut and bent from the plate main body. However, the circumferentially opposite ends of the radially outer cover portions 14 have reinforcing portions 14a integrally extending from the radially outer portion to the radially inner portion. The reinforcing portions 14a are perpendicular to the plate main body.

The spring support portions 11 has an outer peripheral edge formed of the radially outer cover portion 14, an inner peripheral edge formed of the radially inner cover portion 15 and a pair of contact portions 16 on the circumferentially opposite ends. Each contact portion 16 is provided at its radially middle portion with a recess 19 (second support portion). The recesses 19 have a form corresponding to the recesses 27. Each contact portion 16 also has a pair of linear portions 17 and 18 (first support surfaces) on the radially opposite sides of the recesses 19 which are located between the portions 17 and 18. The radially outer linear portion 17 is substantially formed of the inner surface of the reinforcing portion 14a. The radially inner linear portion 18 is formed of a sheared surface which exists as a result of cutting and bending of the inner cover portion 15.

A description will now be given on the damper mechanism 4 arranged between the plates 5 and 6. The damper mechanism 4 is formed of a plurality of coil spring assemblies 13. Each coil spring assembly 13 is formed of a large coil spring 30 (first coil spring), a small coil spring 31 (second coil spring) and a pair of spring seats 34. The spring seats 34 are disposed on the opposite ends of the small coil spring 31, respectively. Each coil spring assembly 13 also preferably includes an elastic float 32 (elastic member), which is located within the small coil spring 31.

Structures of portions for supporting the coil spring assembly 13 in the plates 5 and 6 as well as the hub flange 8 will now be described particularly in connection with the relationship between these portions and the coil spring assembly 13.

The hub flange 8 is preferably provided with four windows 21 which are equally spaced in the rotating direction from each other. Each window 21 has a long form extending in the rotating or circumferential direction. The edge of the window 21 has a pair of contact portions 24 located on the circumferentially opposite ends, an outer peripheral portion 22 on the outer radial side and an inner peripheral portion 23 on the inner radial side. The contact portions 24 are substantially parallel to the center radial line extending from the axis of rotation O—O through the circumferential center of the corresponding window 21. The outer peripheral portion 22 is curved along the rotating direction of the clutch disk assembly 1, while the inner peripheral portion 23 extends substantially perpendicular to the contact portions 24. The contact portions 24 are each provided at its radially middle portion with a recess 27 (concave portion). The recess 27 has an arc-shaped form opened in the circumferential direction of the clutch disk assembly 1. The contact portions 24 of the windows 21 are each formed of the recess 27 (second support) and a pair of linear portions 25 and 26 (first supports) located on the radially opposite sides of the recess 27.

One of the coil spring assemblies 13 is arranged in each of the windows 21. The circumferentially opposite ends of the large coil spring 30 are supported by the contact portions 24, respectively. More specifically, each of the circumferentially opposite ends of the large coil spring 30 has radially opposite portions which are in contact with or close to the linear portions 25 and 26 of the contact portions 24. Each small coil spring 31 has a wire diameter and a coil diameter, which are smaller than those of the large coil spring 30, respectively. The small coil springs also have smaller springs constant than that of the large coil springs 30. The small coil springs 31 are arranged within the large coil springs 30. The small coil springs 31 are supported at their circumferentially opposite ends by the contact portions 24 through spring seats 34.

Figure 5:
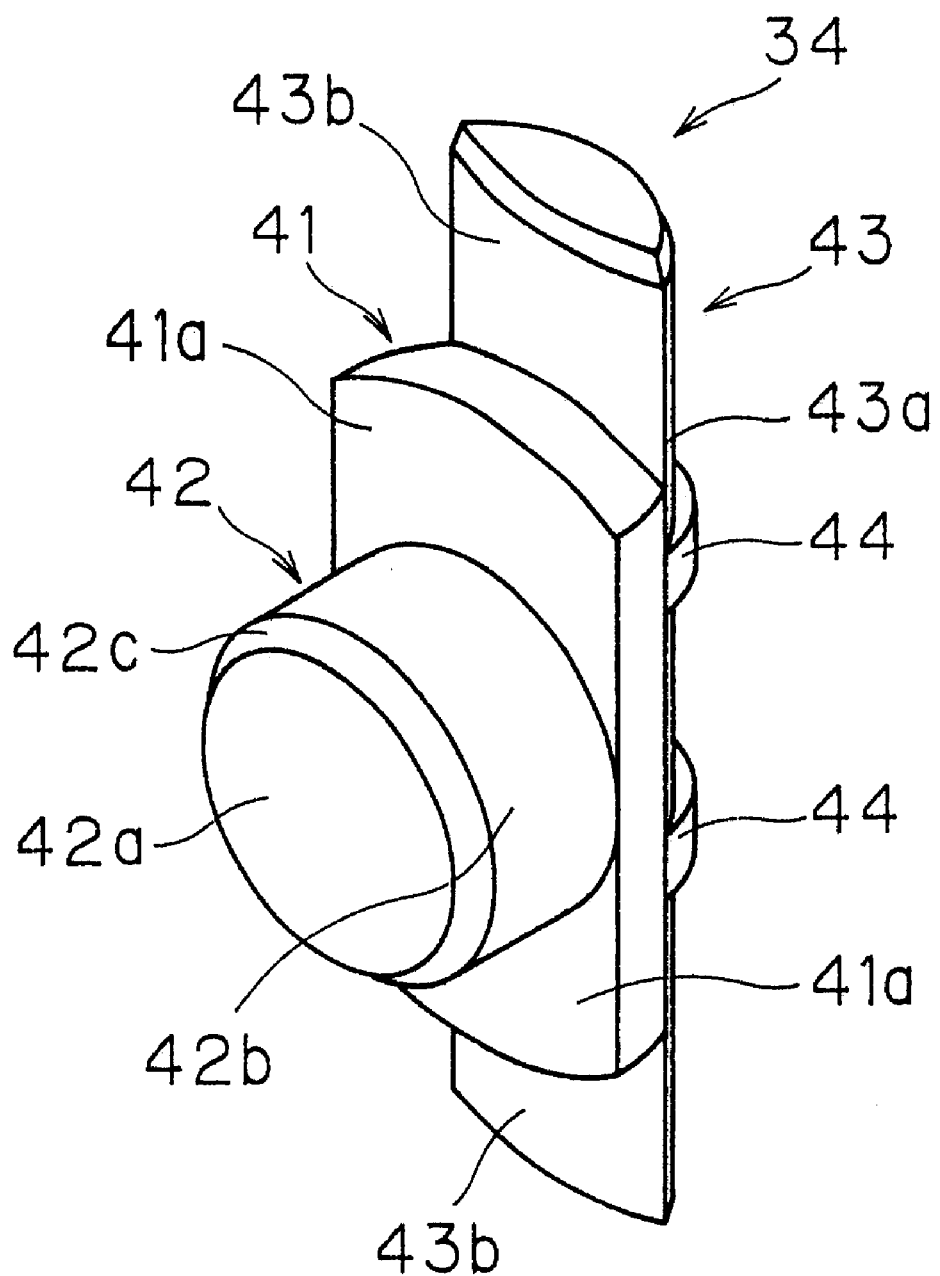
FIG. 5 is a front side perspective view of one of the spring seats used in the clutch disk assembly illustrated in FIGS. 1–4.

The structure of the spring seats 34 will now be described. As shown in FIG. 5, each spring seat 34 is formed of a support portion 41, a projected portion 42, a rotating portion 43 and a pair of restraint portions 44. When the spring seats 34 are located in the recesses 27, the spring seats 34 are generally arranged to extend in an axial direction of the clutch disk assembly 1. The support portion 41 is provided at its one side with a support surface 41a, which is a flat surface extending in an axial direction of the clutch disk assembly 1. The projected portion 42 extends circumferentially from the axially middle portion of the support surface 41a. The projected portion 42 has a substantially cylindrical or columnar form, with has a contact surface 42a and an outer peripheral surface 42b. The contact surface 42a is flat, and is parallel to an opposing contact surface 42a on an opposing spring seat 34. A chamfer 42c is formed on a boundary between the contact surface 42a and the outer peripheral surface 42b. The axially opposite edges of the support surface 41a form a pair of arcs on the same circle. When the small coil spring 31 is combined with a pair of the spring seats 34, each of the circumferential ends of the small coil spring 31 is in circumferential contact with one of the support surfaces 41a. Furthermore, the inner side or periphery of the small coil spring 31 is in contact with the outer peripheral surface 42b. When the inner diameter of the small coil spring 31 in the free state is smaller than the outer peripheral surface 42b, each end of the small coil spring 31 is pressed to the outer peripheral surface 42b. As shown in FIG. 3, the outer periphery of the small coil spring 31 is substantially coincident with the opposite curved ends of the support surface 41a.

Figure 6:
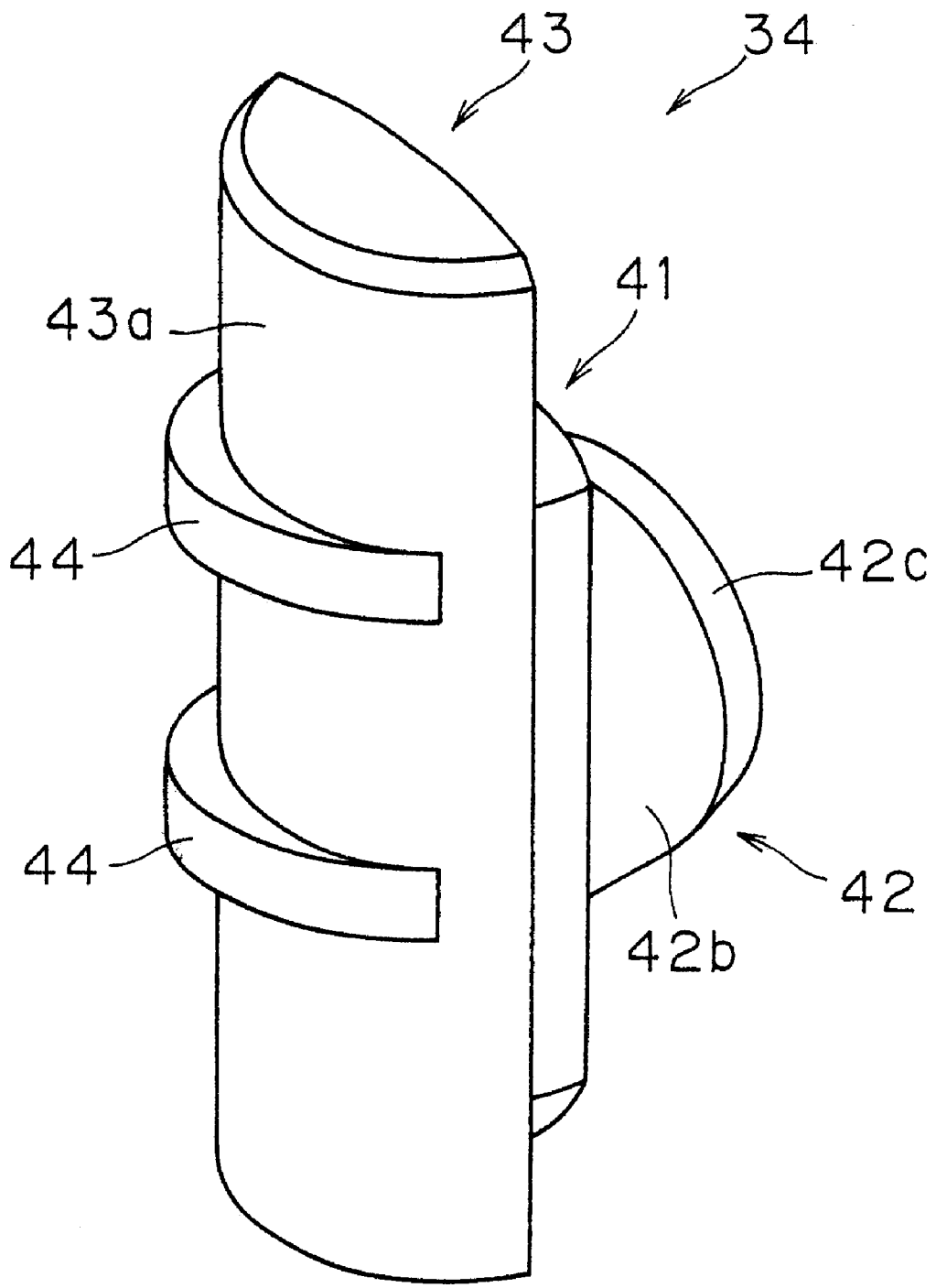
FIG. 6 is a rear side perspective view of the spring seat illustrated in FIG. 5 for use with the clutch disk assembly illustrated in FIGS. 1–4.
Figure 7:
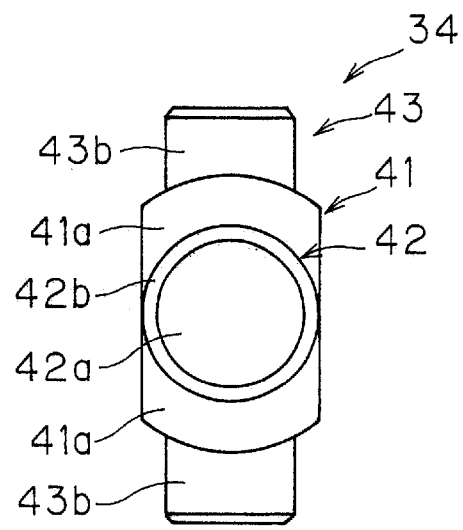
FIG. 7 is a front side elevational view of the spring scat illustrated in FIGS. 5 and 6 for use with the clutch disk assembly illustrated in FIGS. 1–4.
Figure 8:
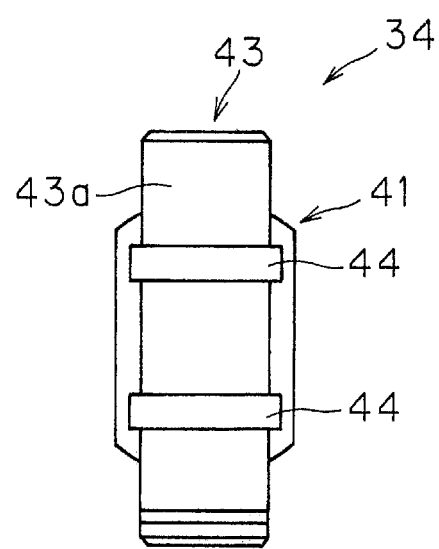
FIG. 8 is a rear side elevational view of the spring seat illustrated in FIGS. 5–7 for use with the clutch disk assembly illustrated in FIGS. 1–4.
Figure 9:
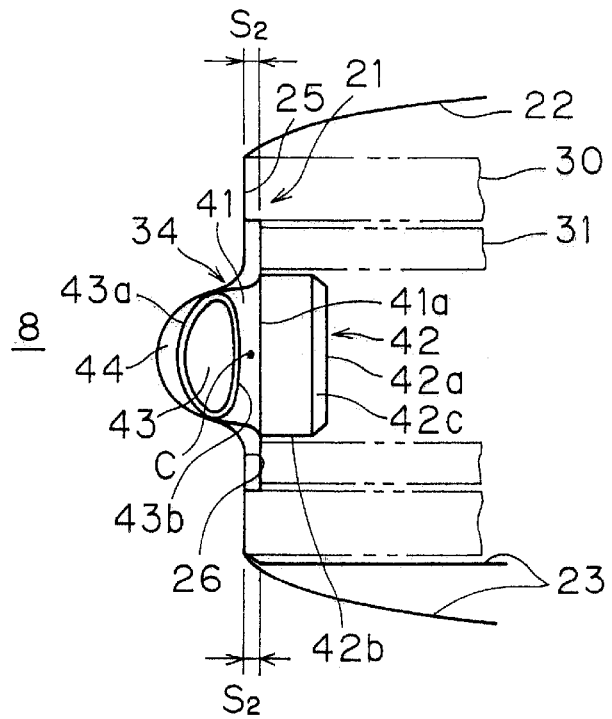
FIG. 9 is a schematic elevational view of part of the damper mechanism which shows a relationship between the spring seat and the hub flange as well as other selected members of the clutch disk assembly illustrated in FIGS. 1–4.
Figure 10:
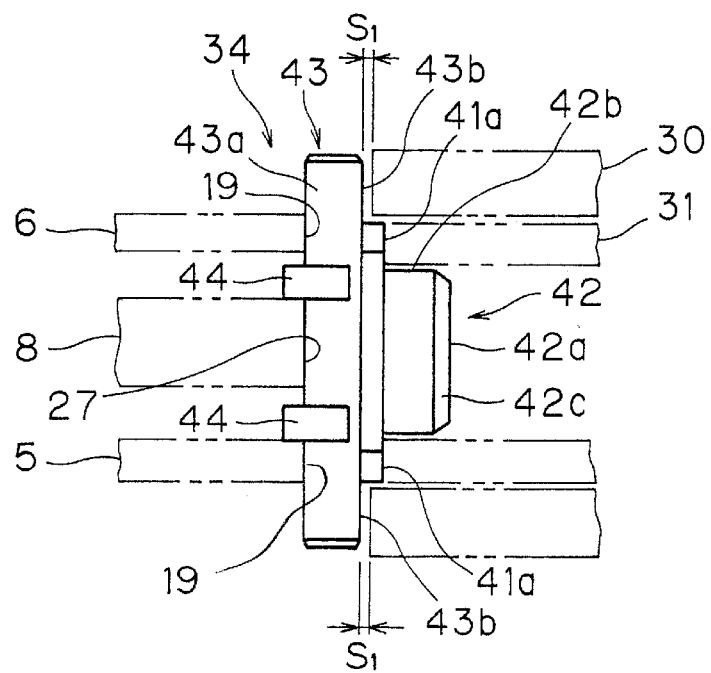
FIG. 10 is a schematic plan view of part of the damper mechanism which shows a relationship between the spring seat and the hub flange as well as other selected members of the clutch disk assembly illustrated in FIGS. 1–4.

As best seen in FIG. 6, the rotating portion 43 (engagement portion) is formed on the side of the support portion 41 remote from the projected portion 42. The rotating portion 43 extends axially oppositely from the support portion 41. The surface of the rotating portion 43 remote from the support portion 41 forms a curved engagement surface 43a. The curved engagement surface 43a forms an arc having its center of curvature lying along an axis that is parallel to the axial direction of the clutch disk assembly 1. The axially middle portion of the curved engagement surface 43a is engaged with one of the recesses 27 of one of the windows 21. The spring seat 34 is held in the recess 27 by the biasing force of the small coil spring 30. Therefore, the spring seat 34 can be disengaged from the contact portion 24 toward the opposed spring seat 34 by compressing the small spring 30 in the circumferential direction of the clutch disk assembly 1. Furthermore, the spring seat 34 is unmovable in the radial direction of the clutch disk assembly 1. However, the spring seat 34 is supported on the contact portion 24 so that it can rotate around a rotation axis C which is parallel to the rotation axis O—O of the clutch disk assembly 1. The rotation axis C is located on the spring seat 34 and particularly, on the support portion 41.

The engagement surface 43a is provided at the side remote from the support portion 41 with two restraint portions 44. The two restraint portions 44 are formed in the axially spaced positions of the axially middle portion. Each restraint portion 44 has a substantially crescent form extending over the whole section of the engagement surface 43a. The two restraint portions 44 are located on the axially opposite sides of the hub flange 8. The two restraint portions 44 are axially opposed to portions of the hub flange 8 located around the recess 27. Therefore, the spring seat 34 can move in neither of the axially opposite directions with respect to the hub flange 8 when it is engaged with the circumferential end of the window 21. The rotating portion 43 has opposition surfaces 43b neighboring to the support portion 41. The opposition surfaces 43b are formed on the axially opposite sides of the support portion 41. Each opposition surface 43b forms an arc on a section or plane perpendicular to the axial direction, and has radially opposite portions located circumferentially outside the radially middle portion. The arc defined by the opposition surface 43b has a larger radius than the arc defined by the engagement surface 43a. This structure suppresses contact of the radially opposite ends of the opposition surface 43b with the large coil spring 30 even when the spring seat 34 rotates around the rotation axis C.

Figure 4:
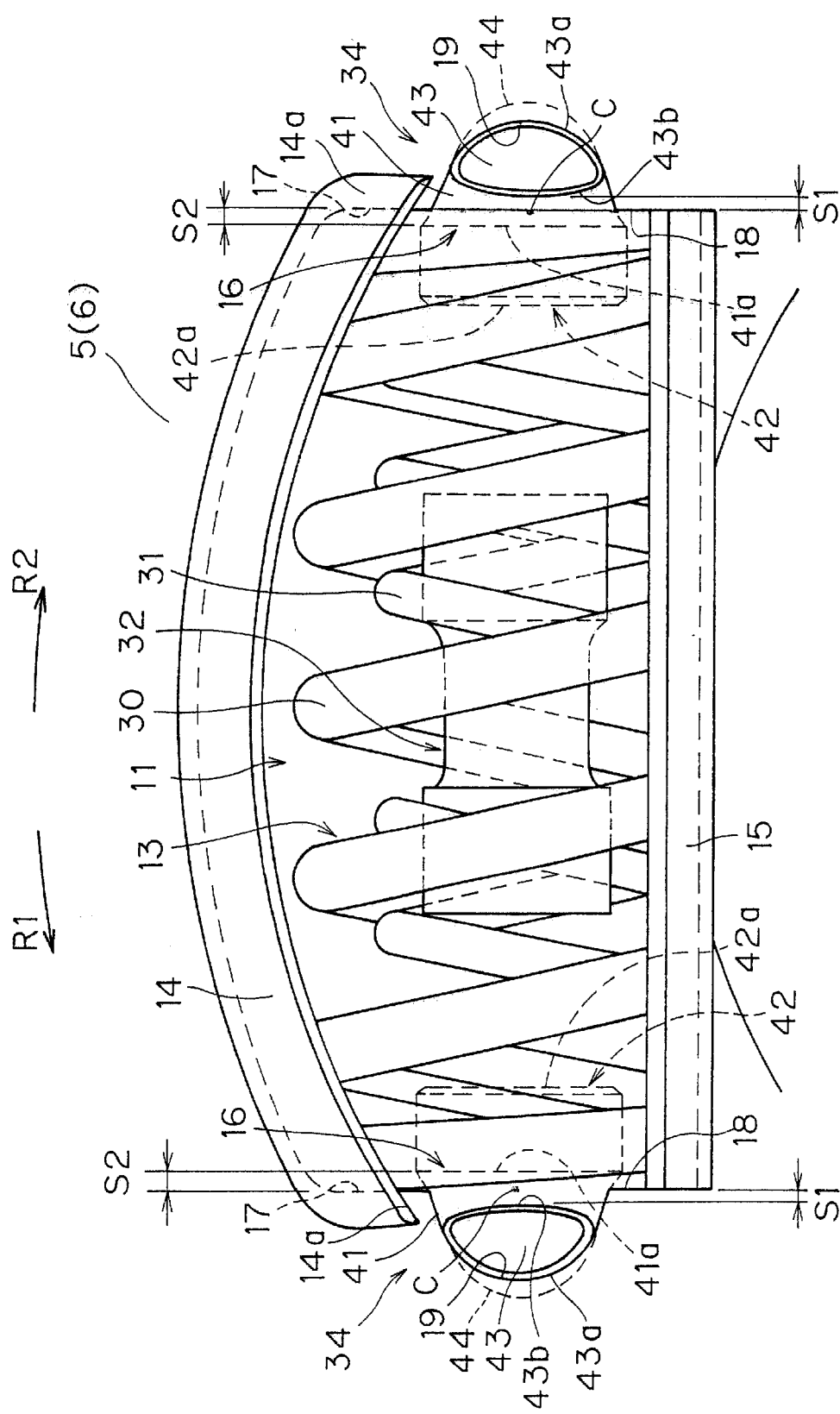
FIG. 4 is an enlarged, fragmentary side elevational view of the clutch disk assembly illustrated in FIGS. 1–3 showing the interconnection between one of the clutch and retaining plates and the hub flange via the coil spring assembly shown in FIG. 3.

As shown in FIG. 4, the support surfaces 41a of the spring seat 34 are in the position shifted from the linear portions 17 and 18 of the contact portion 16 toward the inner side in the circumferential direction of the clutch disk assembly 1 (i.e., toward the opposed spring seat 34). Thereby, the surface of the circumferential end of the small coil spring 31 is reliably spaced by a predetermined space S2 (second space) from the linear portions 17 and 18. The size of the space S2 is determined to prevent contact of the small coil spring 31 with the linear portions 17 and 18 even when the small coil spring 31 is compressed.

The engagement surfaces 43a (particularly, the axially opposite portions) of the rotating portions 43 are engaged with the recesses 19 of the plates 5 and 6. Thereby, the spring seats 34 can be disengaged from the contact portions 16 toward the circumferentially inner side (i.e., toward the opposed spring seat 34). The spring seats 34 are rotatable around the axis C parallel to the rotation axis O—O of the clutch disk assembly 1 while being supported by the contact portions 16.

One of the restraint portions 44 is located on the axially inner side of the plate 5 (i.e., the side opposed to the plate 6). The other restraint portion 44 is located on the axially inner side of the plate 6 (i.e., the side opposed to the plate 5). The two restraint portions 44 are axially opposed to the portions of the plates 5 and 6 located around the recesses 27, respectively. As a result, the spring seats 34 are restrained from movement in the axially opposite directions with respect to the plates 5 and 6 when it is engaged with the circumferential end of the spring support portion 11.

The opposition surfaces 43b are opposed to the axially opposite portions of the surface of the circumferential end of the large coil springs 30. However, the opposition surfaces 43b are located circumferentially outside the linear portions 17 and 18. Thereby, a predetermined space S1 (first space) is maintained between the surface of the circumferential end of the large coil springs 30 and the opposition surfaces 43b. The space S1 is determined such that the large coil springs 30 do not come into contact with the opposition surfaces 43b even when the large coil springs 30 are compressed.

It can be understood from the above that the small coil springs 31 are supported by both kinds of rotary members (i.e., the plates 5 and 6, and the hub flange 8) through only the spring seats 34. Furthermore, the spring seats 34 are rotatably supported on both kinds of rotary members. The large coil springs 30 are directly supported by both kinds of rotary members, and is configured to apply no load to the spring seats 34. The spring seats 34 are rotatably supported on both kinds of rotary members (the plates 5 and 6, and the hub flange 8). As seen in the elevational view, the contact surfaces 42a of the spring seats 34 are parallel to the linear portions 17 and 18 of the contact portions 16 when the contact surfaces 42a are in the neutral position. Similarly, the contact surfaces 42a are parallel to the linear portions 25 and 26 of the contact portions 24 when the contact surfaces 42a are in the neutral position. When the spring seats 34 rotate around the rotation axis C, they can incline with respect to the linear portions 17, 18, 25 and 26.

The elastic floats 32 are elastic members which are arranged in the windows 21 and the spring support portions 11, and are disposed inside the large and small coil springs 30 and 31. Each elastic float 32 is configured to be compressed and thereby achieve characteristics of high rigidity when the torsion angle increases. The elastic floats 32 are located within the small coil springs 31 and between the paired spring seats 34. The elastic floats 32 can move a predetermined circumferential distance or a predetermined angle, and are not compressed before the torsion angle between the first and second rotary members increases.

The elastic floats 32 are preferably elastic members such as a molded member of an elastic resin material. The elastic resin material can be, e.g., thermoplastic polyester elastomer. The elastic floats 32 have a substantially cylindrical or columnar form, and is formed of a main body forming its middle portion and seat portions formed on the opposite sides of the main body. The seat portions have a larger diameter than the main body, and are slightly smaller than the inner diameter of the small coil springs 31. The circumferential lengths or angles of the elastic floats 32 are shorter than the circumferential lengths or angles between the paired spring seats 34 or the circumferential lengths or angles between the contact surfaces 42a. Thus, the elastic floats 32 are movable in the circumferential direction through a region inside the small coil springs 31 and between the paired spring seats 34. Furthermore, the elastic floats 32 are not compressed during the initial stage of compression of the large and small coil springs 30 and 31.

In this embodiment, the elastic floats 32 are made of an elastic resin material. However, the elastic floats 32 can be formed of an elastic portion made of rubber and hard resin portions arranged on the opposite sides of the elastic portion similarly to a conventional elastic float.

Figure 11:
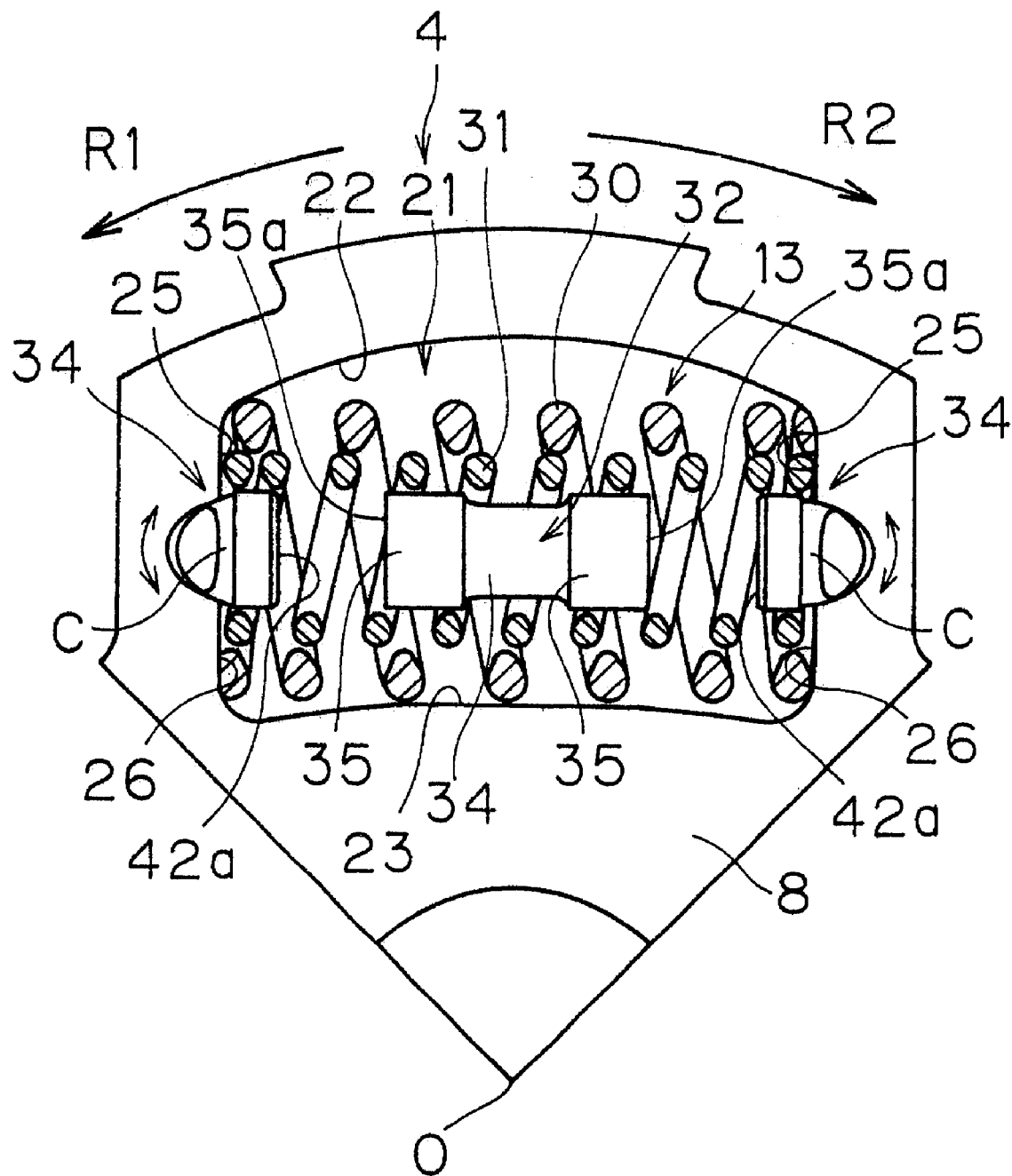
FIG. 11 is a schematic, fragmentary elevational view of part of the damper mechanism which shows an operation of the damper mechanism of the clutch disk assembly illustrated in FIGS. 1–4, prior to compression of the damper mechanism.
Figure 12:
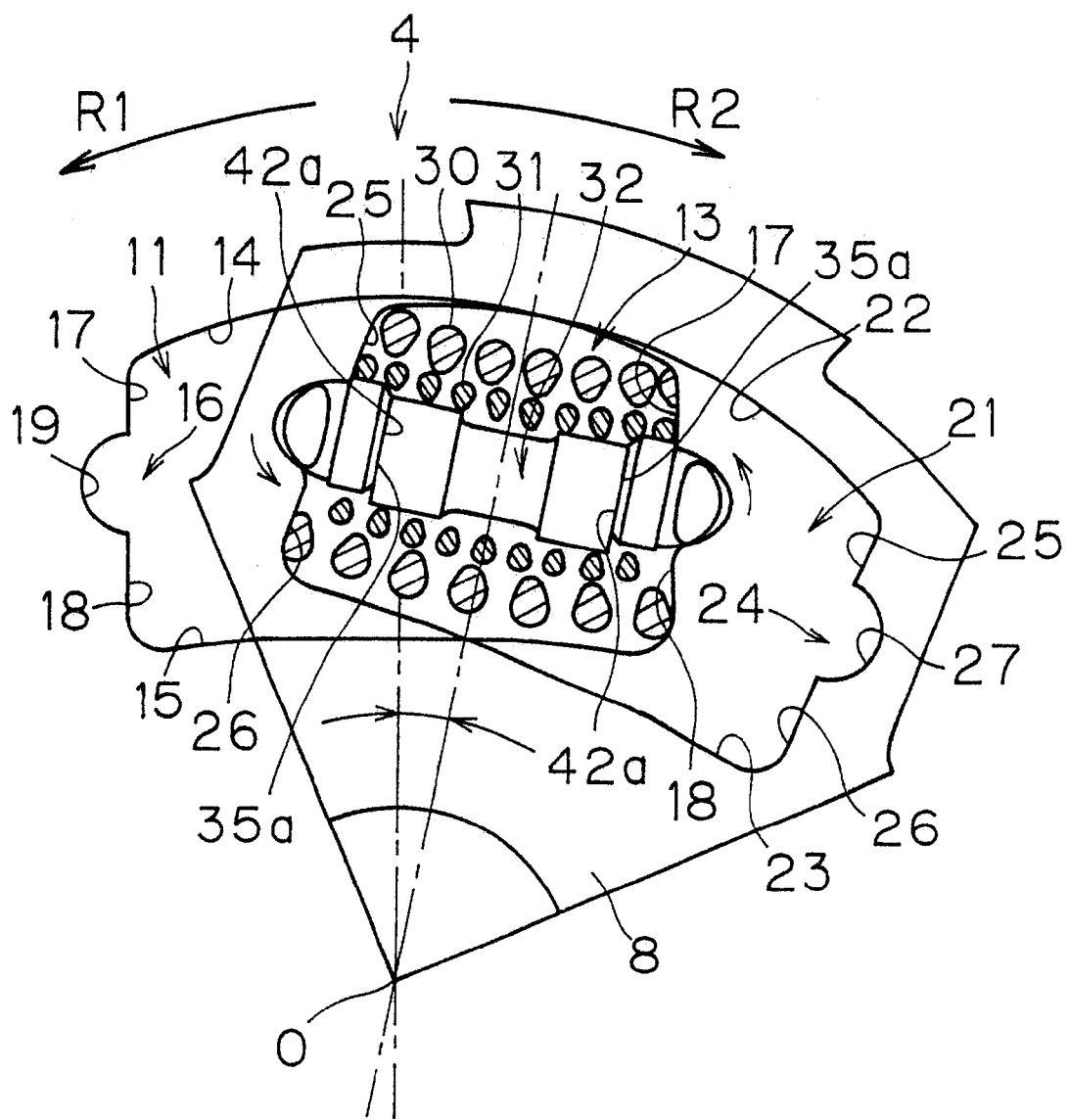
FIG. 12 is a schematic, fragmentary elevational view of part of the damper mechanism which shows an operation of the damper mechanism of the clutch disk assembly illustrated in FIGS. 1–4, after compression of the damper mechanism.

Operation of the damper mechanism 4 will now be described with reference to FIGS. 11 and 12. FIG. 11 shows a neutral state of the plates 5 and 6 in which the plates 5 and 6 have not rotated relatively to the hub flange 8. Referring to FIG. 11, it is assumed that the plate 5 and 6, which are in the state shown, are fixedly coupled to another member. It is also assumed that the hub flange 8 is rotated in the rotating direction R2 with respect to the plates 5 and 6. Thereby, the large and small coil springs 30 and 31 are compressed parallelly between the contact portions 24 on the R1 side of the windows 21 in the hub flange 8 and the contact portions 16 on the R2 side of the spring support portions 11 of the plates 5 and 6. Referring to FIG. 12, when the plates 5 and 6 are rotated relative to the hub flange 8, the elastic float 32 is held between the paired spring seats 34 to stop the relative rotation between the two kinds of rotary members (plates 5 and 6 and the hub flange 8).

While the large and small coil springs 30 and 31 are being compressed, the contact portions 24 on the R1 side of the window 21 moves such that the radially outer portions thereof move a larger distance in the rotating direction than the inner portions. Therefore, the large and small coil springs 30 and 31 can be compressed such that the radially outer portions are compressed over a larger distance than the radially inner portions. However, each of the small coil springs 31 is supported by the pair of rotatable spring seats 34 so that it is compressed in a relatively parallel fashion when compared to the prior art. Thus, the spring seats 34 rotate by being pressed against the recesses 19 and 27 by the loads applied from the small coil springs 31. More specifically, the spring seats 34 on the R1 side rotate to direct its contact surfaces 42a radially outward, and the spring seats 34 on the R2 side rotate to direct its contact surfaces 42a radially inward.

The state in which the spring seats 34 are supported during the above operation will now be described in greater detail. The spring seats 34 on the R1 side are supported by the contact portions 24 on the R1 side of the windows 21. The spring seats 34 on the R2 side are supported by the contact portions 16 on the R2 side of the spring support portions 11. More specifically, the spring seats 34 on the R1 side are supported such that the engagement surfaces 43a of their rotating portions 43 and particularly, their axially middle portions are supported in the circumferential direction of the clutch disk assembly 1 by the recesses 27 of the contact portions 24. The spring seats 34 on the R2 side are supported such that the engagement surfaces 43a of its rotating portions 43 and particularly, its axially opposite portions are supported in the circumferential direction of the clutch disk assembly 1 by the recesses 19 of the contact portions 16 of the plates 5 and 6. In the above state, each spring seat 34 is biased toward the recesses 19 and 27 by the small coil spring 31 and can rotate along the configurations of the recesses 19 and 27.

A circumferential space is kept between the end on the R1 side of the small coil springs 31 and the contact portions 24 (particularly, the linear portion 25) of the hub flange 8 even when the relative rotation angle increases to the maximum value. Thus, the small coil springs 31 do not come into contact with the hub flange 8 during compression. Therefore, the entire loads applied from the small coil springs 31 are exerted on the spring seats 34 to rotate it. Furthermore, the opposite ends of the large coil springs 30 are circumferentially spaced from the opposition surfaces 43b of the spring seats 34, respectively, even when the relative rotation angle increases to the maximum value. Thus, the large coil springs 30 do not come into contact with the spring seats 34 during compression. Therefore, the spring seats 34 are not pressed against the recesses 19 and 27 by an excessively large force. Accordingly, a large sliding resistance does not occur when the spring seats 34 rotate around the rotation axis C with respect to the recesses 19 and 27.

As described above, the small coil springs 31 are compressed in a more parallel fashion than the prior art, and therefore a bending stress can be suppressed. Therefore, the small coil springs 31 can have improved reliability.

Since the small coil springs 31 are compressed in a more parallel fashion than the prior art, the elastic floats 32 can maintain an appropriate attitude or position. More specifically, the contact surfaces 35a of the elastic floats 32 can come into contact with the contact surfaces 42a of the spring seats 34 through their entire areas. Therefore, these contact surfaces 35a and 42a receive the force in the substantially normal direction. Further, in other words, the elastic floats 32 are in the substantially parallel-compressed state. The elastic floats 32, therefore, generate a sufficiently large load when the paired spring seats 34 and the elastic floats 32 are in the contact state shown in FIG. 12. The parallel compression improves the durability of the elastic floats 32.

The elastic floats 32 are arranged within each set of the support portions 11 and the windows 21. However, the elastic float(s) 32 can be arranged in only one or some of the sets.

Second Embodiment

Referring now to FIGS. 13 through 20, a plurality of modified spring seats 34' in accordance with a second embodiment of the present invention is illustrated. The spring seats 34' are used with the clutch disk assembly 1 of the first embodiment discussed above. Basically, the elastic floats 32 and the spring seats 34 of the first embodiment are replaced with the modified spring seats 34' in the second embodiment. Therefore, the following description of the spring seats 34' of the second embodiment will focus only on the differences from the first embodiment, and the same and similar portions will not be described or illustrated herein.

Figure 19:
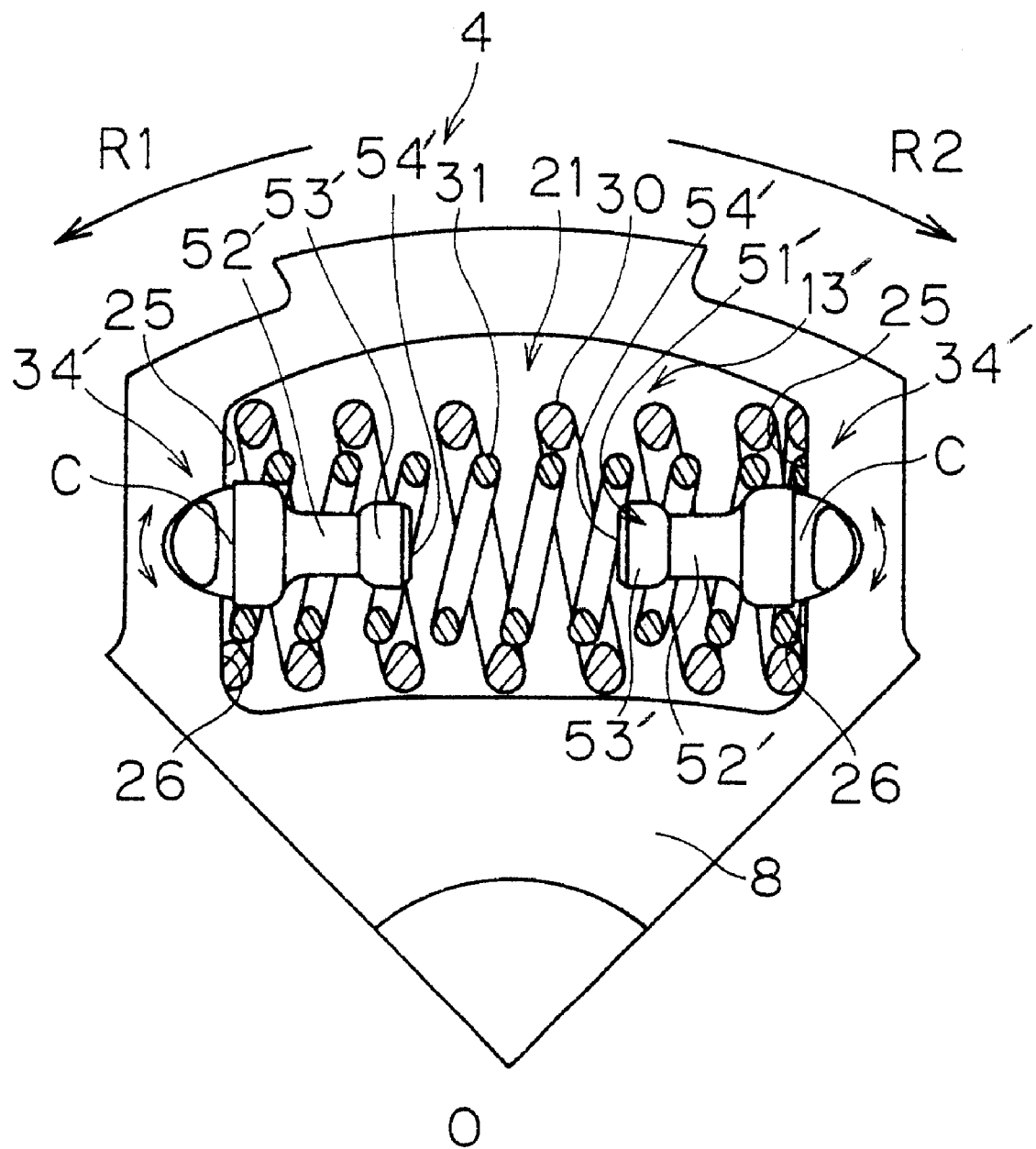
FIG. 19 a schematic, fragmentary elevational view of part of the damper mechanism which shows an operation of the damper mechanism of the clutch disk assembly of the second embodiment, prior to compression of the damper mechanism.

Similar to the first embodiment, each coil spring assembly 13' of the second embodiment is formed of the large coil spring 30, the small coil spring 31 and a pair of the spring seats 34' arranged on the opposite ends of the small coil spring 31. The coil spring assembly 13' does not have an elastic float as shown in FIG. 19.

Figure 13:
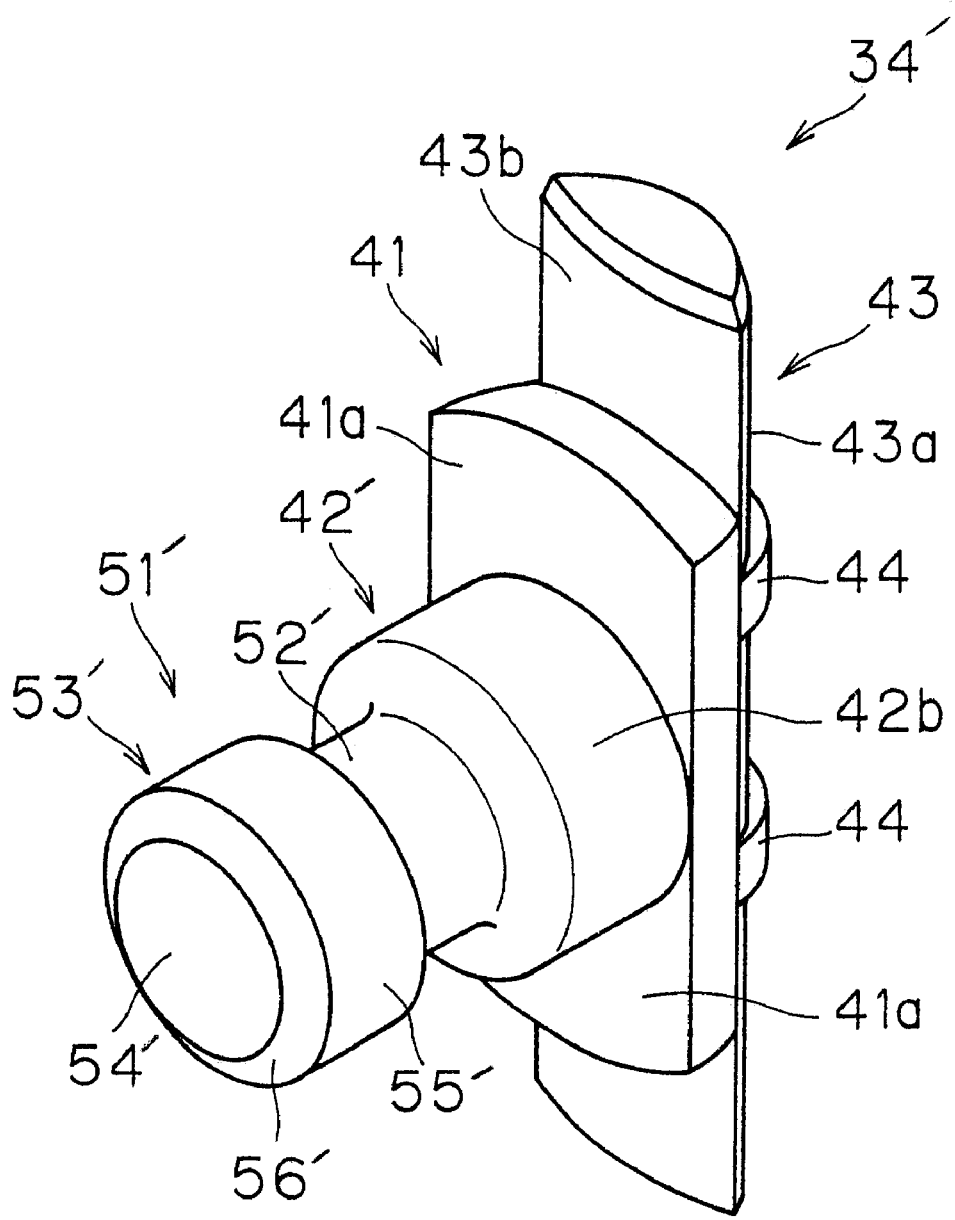
FIG. 13 is a front side perspective view of a spring seat which is used in the clutch disk assembly illustrated in FIGS. 1–4 in accordance with a second embodiment of the present invention.
Figure 14:
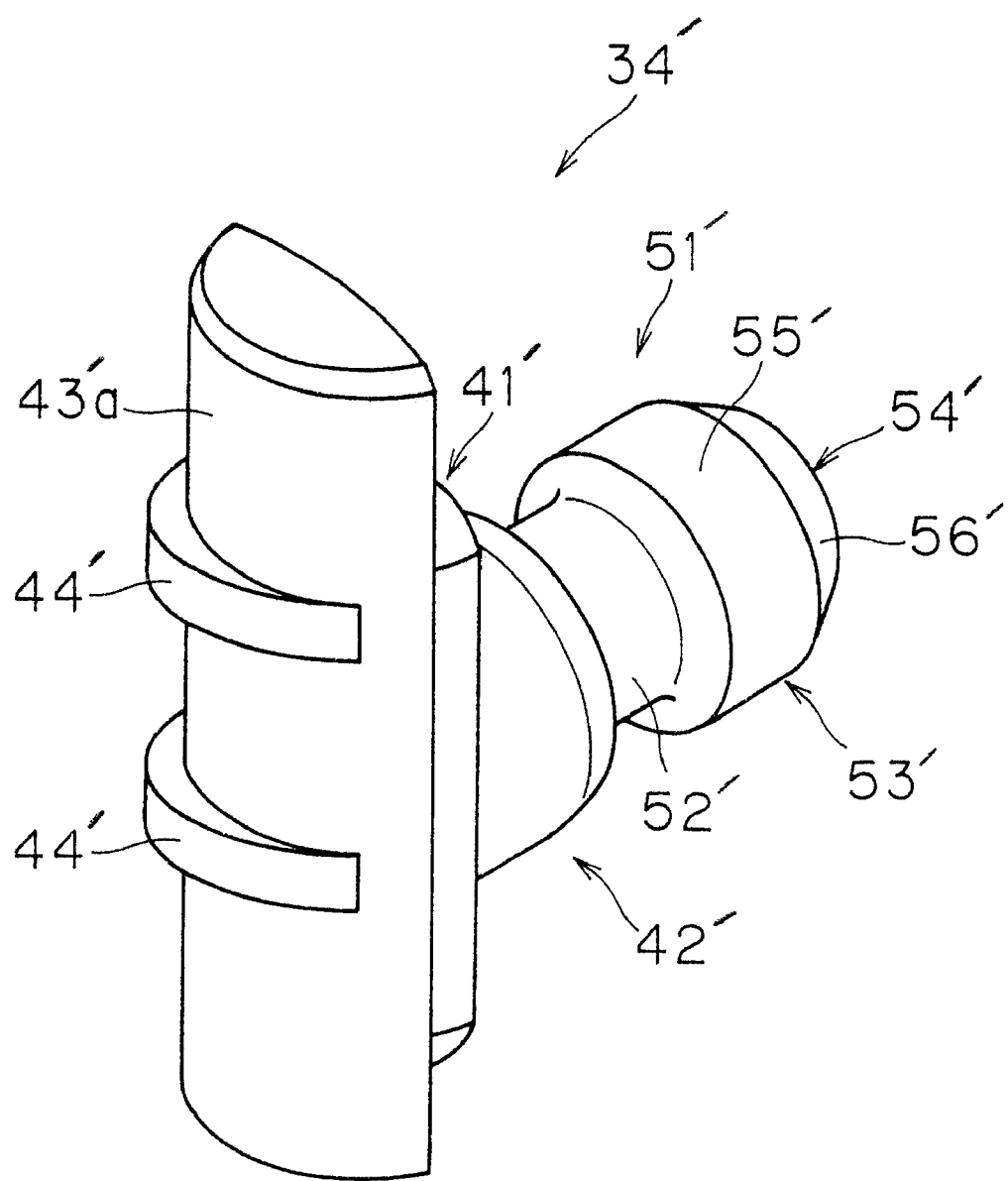
FIG. 14 is a rear side perspective view of the spring seat illustrated in FIG. 13 for use with the clutch disk assembly illustrated in FIGS. 1–4.
Figure 15:
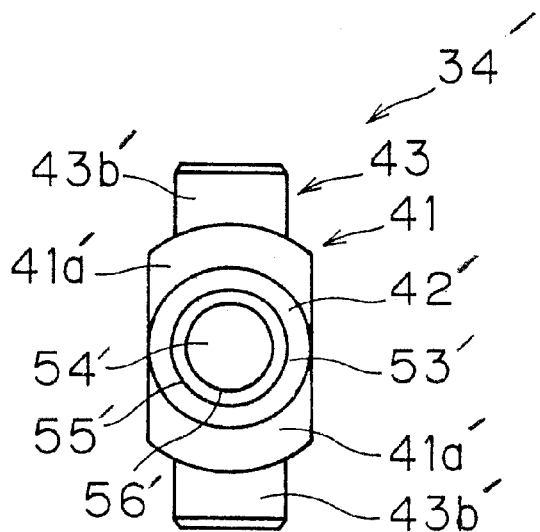
FIG. 15 is a front side elevational view of the spring seat illustrated in FIGS. 13 and 14 for use with the clutch disk assembly illustrated in FIGS. 1–4.
Figure 16:
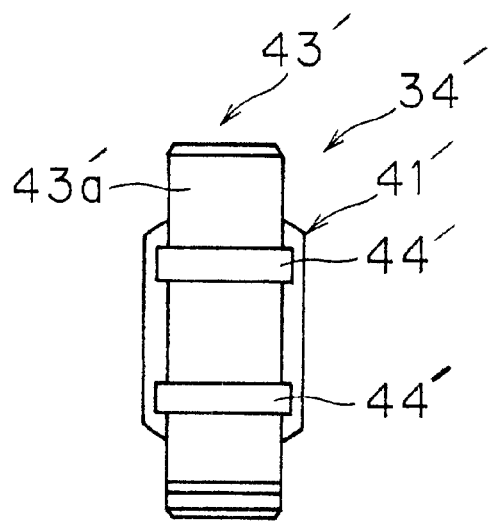
FIG. 16 is a rear side elevational view of the spring seat illustrated in FIGS. 13–15 for use with the clutch disk assembly illustrated in FIGS. 1–4.
Figure 17:
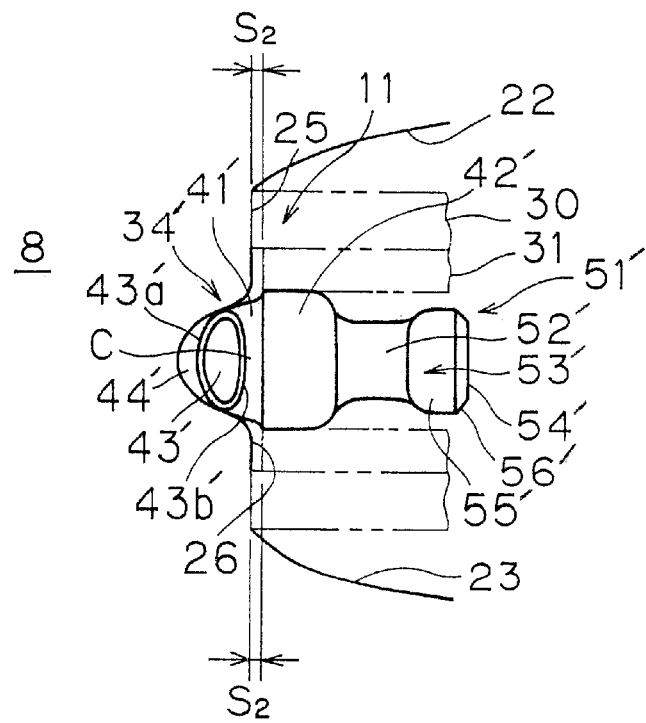
FIG. 17 is a schematic elevational view of part of the damper mechanism which shows a relationship between the spring seat of the second embodiment and the hub flange as well as other selected members of the clutch disk assembly illustrated in FIGS. 1–4.
Figure 18:
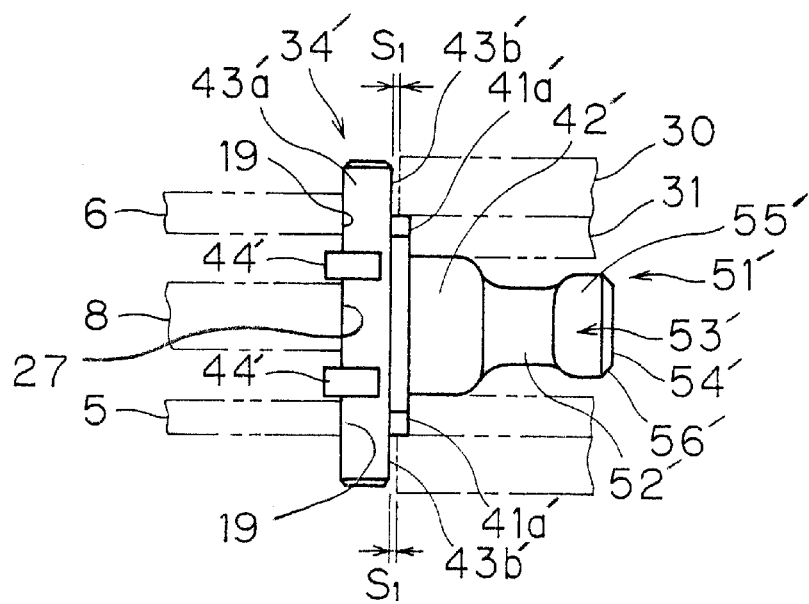
FIG. 18 is a schematic plan view of part of the damper mechanism which shows a relationship between the spring seat of the second embodiment and the hub flange as well as other selected members of the clutch disk assembly illustrated in FIGS. 1–4.

The spring seats 34' are formed entirely of a molded member of an elastic resin material. The elastic resin material can be, for example, thermoplastic polyester elastomer. Each spring seat 34' is provided with a projection 51'. The opposed projections 51' can come in to contact with each other so that the relative rotation between the first and second rotary members (the plates 5 and 6, and the hub flange 8) stops. As shown in FIG. 13, the projection 51' is formed of an extended portion 52' extending from the projected portion 42' and a contact portion 53' formed on the extended portion 52'. The extended portion 52' and the contact portion 53' have smaller diameters than the projected portion 42'. The extended portion 52' and the contact portion 53' are spaced from the inner side of the small coil spring 31. The contact portion 53' has an outer peripheral surface 55' having a larger diameter than the extended portion 52' and a contact surface 54' on the free end. The contact surface 54' is flat, and is parallel to the other contact surface 54' opposed thereto. A chamfer 56' is formed between the contact surface 54' and the outer peripheral surface 55'.

As seen in the elevational view, the contact surface 54' of the spring seat 34' is parallel to the linear portions 17 and 18, and 25 and 26 of the contact portions 16 and 24, respectively, when it is in the neutral position. When the spring seats 34' rotate around the rotation axis C, they can incline with respect to the linear portions 17, 18, 25 and 26.

Operation of the damper mechanism 4 will now be described with reference to FIGS. 19 and 20. FIG. 19 shows a neutral state of the plates 5 and 6 in which the plates 5 and 6 are not rotated relatively to the hub flange 8. Referring to FIG. 19, it is assumed that the plate 5 and 6 which are in the state shown, arc fixedly coupled to another member. It is also assumed that the hub flange 8 is rotated in the rotating direction R2 with respect to the plates 5 and 6. Thereby, the large and small coil springs 30 and 31 are compressed in parallel between the contact portions 24 on the R1 side of the windows 21 in the hub flange 8 and the contact portions 16 on the R2 side of the spring support portions 11 of the plates 5 and 6.

Figure 20:
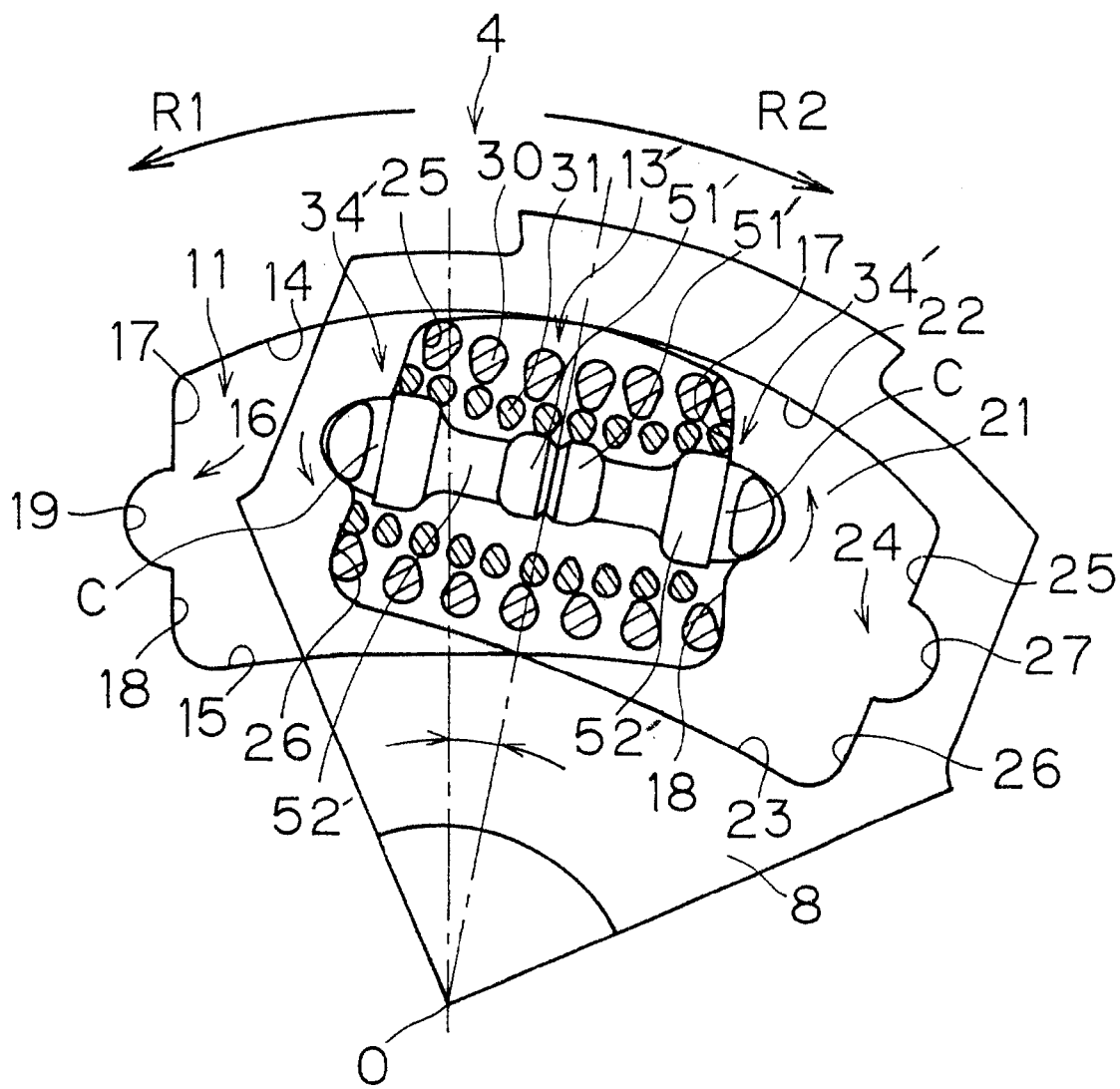
FIG. 20 is a schematic, fragmentary elevational view of part of the damper mechanism which shows an operation of the damper mechanism of the clutch disk assembly of the second embodiment, after compression of the damper mechanism.

When the members enter the state shown in FIG. 20, the contact surfaces 54' of the paired spring seats 34' come into contact with each other to stop the relative otation between the rotary members (plates 5 and 6, and the hub flange 8). In this tate, a large stop torque is obtained owing to the paired spring seats 34'.

While the large and small coil springs 30 and 31 are being compressed, the contact portions 24 on the R1 side of the windows 21 move such that the radially uter portions thereof move a larger distance in the rotating direction than the inner portions. Therefore, the large and small coil springs 30 and 31 can be compressed such that the radially outer portions are compressed over a greater length than the radially inner portions. However, each of the small coil springs 31 is supported by the pair of rotatable spring seats 34' so that it is compressed in a relatively parallel fashion compared with the prior art. Thus, the spring seats 34' rotate by being pressed against the recesses 19 and 27 by the loads applied from the small coil springs 31. More specifically, the spring seats 34 on the R1 side rotate to direct its contact surface 54' radially outward, and the spring seats 34' on the R2 side rotate to direct its contact surface 54' radially inward. As described above, the small coil springs 31 are compressed in a more parallel fashion than the prior art, and therefore a bending stress can be suppressed. Therefore, the small coil springs 31 can have improved reliability.

The spring seats 34' are rotated by the loads applied from the small coil springs 31 so that the contact surfaces 54' become parallel to each other. Therefore, the total surface area of the contact surfaces 54' come into contact with each other. Therefore, these contact surfaces 54' receive the force in the substantially normal direction. Referring to FIG. 20, the spring seats 34' are shown in the contact state and in the substantially parallel-compressed state. Therefore, in this state, the spring seats 34' generate a sufficiently large load. The parallel compression improves the durability of the spring seats 34'.

As described above, the paired spring seats 34' come into contact with each other when the plates 5 and 6 rotate relatively to the flange 8, and thereby generate a large load to achieve a desired stop torque. Since the paired spring seats 34' in this embodiment are made of an elastic resin material, a desired elastic function can be achieved. The spring seats 34' are compressed such that the projections 51' are primarily compressed. Particularly, the extended portions 52' of spring seats 34' have small diameters, and thus, the extended portions 52' are compressed to a higher extent than the contact portions 53'.

In this embodiment, the elastic floats in the prior art are not required so that the number of parts and therefore the manufacturing cost can be reduced.

According to the damper disk assembly of the present invention, the spring seats 34' are supported in the rotating direction by the spring accommodating apertures and the spring accommodating portions so that the spring seats 34' are rotated by the load applied from the coil springs 31. Therefore, the coil springs 31 are compressed in a more parallel fashion than the prior art.

While only selected embodiments have been chosen to illustrate the present invention, it will be apparent to those skilled in the art from this disclosure that various changes and modifications can be made herein without departing from the scope of the invention as defined in the appended claims. For example, in the foregoing embodiments, the hub flange 8 is isolated from the spline hub 3, but can be integral with the spline hub 3. Moreover, the damper disk assembly according to the invention can be employed not only in the clutch disk assembly but also in a damper mechanism of a flywheel assembly and a lockup damper of a torque converter. Furthermore, the foregoing description of the embodiments according to the present invention are provided for illustration only, and not for the purpose of limiting the invention as defined by the appended claims and their equivalents.

What is claimed is:

1. A damper disk assembly comprising:
   a first rotary member having at least one spring accommodating aperture;
   a second rotary member having at least one spring accommodating portion corresponding to said spring accommodating aperture, said second rotary member being arranged near said first rotary member;
   a coil spring being arranged within said spring accommodating aperture and said spring accommodating portion for transmitting a torque between said first and second rotary members;
   a pair of spring seats being arranged on circumferentially opposite ends of said coil spring, said spring seats supporting the circumferentially opposite ends of said coil spring and engaging with an inner side of said coil spring, said spring seats being circumferentially engageable with circumferentially opposite ends of said spring accommodating aperture and said spring accommodating portion; and
   an elastic member being arranged within said coil spring for being compressed a predetermined amount between said spring seats when said spring seats move toward each other in accordance with relative rotation between said first and second rotary members, said elastic member being configured to stop relative rotation between said first and second rotary members to prevent complete compression of said coil spring,
   said spring seats being supported by the circumferentially opposite ends of said spring accommodating aperture and said spring accommodating portion such that said spring seats are rotatable about an axis parallel to a rotation axis of said first and second rotary members, said spring seats having circumferentially facing spring support surfaces supporting opposite axial end surfaces of said coil spring, each of said spring support surfaces extending in an axial direction substantially parallel to said rotation axis of said first and second rotary members to support each of said opposite axial end surfaces, each of said spring support surfaces having a radial width extending in a direction generally along a radius extending outwardly from said rotation axis of said first and second rotary members, said radial widths of said circumferentially facing spring support surfaces being substantially equal to or less than an inner diameter of said coil spring, such that each of said circumferentially facing spring support surfaces contact less than 360° of each of said opposite axial end surface of said coil spring.

2. The damper disk assembly according to claim 1, wherein
   said circumferentially opposite ends of said spring accommodating aperture and said spring accommodating portion are provided with arc-shaped concave portions facing in the circumferential direction, and
   each of said spring seats has an engagement portion provided with a surface engageable with one of said concave portions.

3. The damper disk assembly according to claim 1, further comprising an outer coil spring being located around said coil spring.

4. The damper disk assembly according to claim 3, wherein
   said circumferentially opposite ends of said spring accommodating aperture and said spring accommodating portion each have a first support surface and a second support surface, said first support surface supporting the circumferentially opposite ends of said outer coil spring, said second support surfaces supporting said spring seats.

5. The damper disk assembly according to claim 4, wherein
   said second support surfaces are arc-shaped concave portions that open in the circumferential direction; and
   each of said spring seats has an engagement portion engageable with one of said concave portions.

6. The damper disk assembly according to claim 1, wherein
   said first rotary member has an additional spring accommodating aperture; and said second rotary member has an additional spring accommodating portion corresponding to said additional spring accommodating aperture with an additional coil spring being arranged within said additional spring accommodating aperture and said additional spring accommodating portion for transmitting a torque between said first and second rotary members, and a pair of additional spring seats being arranged on circumferentially opposite ends of said additional coil spring.

7. The damper disk assembly according to claim 6, wherein
   said second rotary member is formed by a pair of plate members, each of said plate members having said spring accommodating portion and said additional spring accommodating portion with said first rotary members being located between said plate members.

8. The damper disk assembly according to claim 7, wherein
   outer coil spring s are arranged around said coil spring and said additional coil spring for transmitting the torque between said first rotary member and said plate members.

9. The damper disk assembly according to claim 1, wherein
   said second rotary member is formed by a pair of plate members, each of said plate members having said spring accommodating portion corresponding to said spring accommodating aperture, said pair of plate members being arranged on axially opposite sides of said first rotary member and fixedly coupled to each other.

10. A damper disk assembly comprising:
    a first rotary member having at least one spring accommodating aperture;
    a second rotary member having at least one spring accommodating portion corresponding to said spring accommodating aperture, said second rotary member being arranged near said first rotary member with said first and second rotary members having a rotation axis;
    a coil spring being arranged within said spring accommodating aperture and said spring accommodating portion for transmitting a torque between said first and second rotary members; and
    a pair of spring seats being arranged on circumferentially opposite ends of said coil spring, said spring seats supporting the circumferentially opposite ends of said coil spring and engaging with an inner side of said coil spring, said spring seats being engageable with circumferentially opposite ends of said spring accommodating aperture and said spring accommodating portion,
    said spring seats having contact portions extending within said coil spring a predetermined distance to come into contact with each other when said spring seats move toward each other in accordance with the relative rotation between said first and second rotary members and spring support surfaces supporting said coil spring, each of said spring support surfaces extending in an axial direction substantially parallel to said rotation axis of said first and second rotary members, each of said spring support surfaces having a radial width extending in a direction generally along a radius extending outwardly from said rotation axis of said first and second rotary members, said radial width being substantially equal to or less than an inner diameter of said coil spring, and said spring seats being supported by the circumferentially opposite ends of said spring accommodating aperture and said spring accommodating portion such that said spring seats are rotatable about an axis parallel to said rotation axis of said first and second rotary members.

11. The damper disk assembly according to claim 10, wherein said circumferentially opposite ends of said spring accommodating aperture and said spring accommodating portion are provided with arc-shaped concave portions facing in the circumferential direction, and said spring seat has an engagement portion provided with a surface engageable with said concave portions.

12. The damper disk assembly according to claim 10, further comprising an outer coil spring being located around said coil spring.

13. The damper disk assembly according to claim 12, wherein said circumferentially opposite ends of said spring accommodating aperture and said spring accommodating portion each have a first support surface and a second support surface, said first support surface supporting the circumferentially opposite ends of said outer coil spring, said second support surfaces supporting said spring seats.

14. The damper disk assembly according to claim 13, wherein said second support surfaces are arc-shaped concave portions that open in the circumferential direction; and each of said spring seats has an engagement portion engageable with one of said concave portions.

15. The damper disk assembly according to claim 10, wherein said first rotary member has an additional spring accommodating aperture; and said second rotary member has an additional spring accommodating portion corresponding to said additional spring accommodating aperture with an additional coil spring being arranged within said additional spring accommodating aperture and said additional spring accommodating portion for transmitting a torque between said first and second rotary members, and a pair of additional spring seats being arranged on circumferentially opposite ends of said additional coil spring.

16. The damper disk assembly according to claim 15, wherein said second rotary member is formed by a pair of plate members, each of said plate members having said spring accommodating portion and said additional spring accommodating portion with said first rotary members being located between said plate members.

17. The damper disk assembly according to claim 16, wherein outer coil springs are arranged around said coil spring and said additional coil spring for transmitting the torque between said first rotary member and said plate members.

18. The damper disk assembly according to claim 10, wherein said second rotary member is formed by a pair of plate members, each of said plate members having said spring accommodating portion corresponding to said spring accommodating aperture, said pair of plate members being arranged on axially opposite sides of said first rotary member and fixedly coupled to each other.

19. A damper disk assembly comprising:

a first rotary member having at least one spring accommodating aperture;

a second rotary member having at least one spring accommodating portion corresponding to said spring accommodating aperture, said second rotary member being arranged near said first rotary member with said first and second rotary members having a rotation axis;

a first coil spring being arranged within said spring accommodating aperture and said spring accommodating portion, and supported between the circumferentially opposite ends of said spring accommodating portion and said spring accommodating aperture for transmitting a torque between said first and second rotary members;

a second coil spring being arranged within said spring accommodating aperture and said spring accommodating portion, and located within said first coil spring for transmitting the torque between said first and second rotary members; and a pair of spring seats being arranged on circumferentially opposite ends of said second coil springs, said spring seats supporting the circumferentially opposite ends of said second coil spring and engaging with inner side of said second coil spring, said spring seats being circumferentially engageable with circumferentially opposite ends of said spring accommodating aperture and said spring accommodating portion, and said spring seats having spring support surfaces supporting said second coil spring, each of said spring support surfaces extending in an axial direction substantially parallel to said rotation axis of said first and second rotary members, each of said spring support surfaces having a radial width extending in a direction generally along a radius extending outwardly from said rotation axis of said first and second rotary members, said radial width being substantially equal to or less than an inner diameter of said coil spring, said spring seats being supported by said circumferentially opposite ends of said spring accommodating aperture and said spring accommodating portion such that said spring seats are rotatable about an axis parallel to said rotation axis of said first and second rotary members.

20. The damper disk assembly according to claim 19, wherein said circumferentially opposite ends of said spring accommodating aperture and said spring accommodating portion are provided with arc-shaped concave portions facing in the circumferential direction, and each of said spring seats has an engagement portion provided with a surface engageable with one of said concave portions.

21. The damper disk assembly according to claim 19, wherein
said circumferentially opposite ends of said spring accommodating aperture and said spring accommodating portion each have a first support surface and a second support surface, said first support surfaces supporting the circumferentially opposite ends of said first coil spring, said second support surfaces supporting said spring seats.

22. The damper disk assembly according to claim 21, wherein
said second support surfaces are arc-shaped concave portions that open in the circumferential direction; and
each of said spring seats has an engagement portion engageable with one of said concave portions.

23. A damper disk assembly comprising:
a first rotary member having at least one spring accommodating aperture;
a second rotary member having at least one spring accommodating portion corresponding to said spring accommodating aperture, said second rotary member being arranged near said first rotary member;
a first coil spring being arranged within said spring accommodating aperture and said spring accommodating portion, said first coil spring being supported between the circumferentially opposite ends of said spring accommodating portion and said spring accommodating aperture for transmitting a torque between said first and second rotary members;
a second coil spring being arranged within said spring accommodation aperture and said spring accommodating portion, said second coil spring being located within said first coil spring for transmitting the torque between said first and second rotary members; and
a pair of spring seats being arranged on circumferentially opposite ends of said second coil springs, said spring seats supporting the circumferentially opposite ends of said second coil spring and enraging with inner side of said second coil spring, and said spring seats being circumferentially engageable with circumferentially opposite ends of said spring accommodating aperture and said spring accommodating portion, said spring seats being supported by said circumferentially opposite ends of said spring accommodating aperture and said spring accommodating portion such that said spring seats are rotatable about an axis parallel to a rotation axis of said first and second rotary members,
said circumferentially opposite ends of said spring accommodating aperture and said spring accommodating portion each having a first support surface and a second support surface, said first support surfaces supporting the circumferentially opposite ends of said first coil spring, said second support surfaces supporting said spring seats, and
first gaps being formed circumferentially between said spring seats and both of the circumferentially opposite ends of said first coil spring.

24. A damper disk assembly comprising:
a first rotary member having at least one spring accommodating aperture;
a second rotary member having at least one spring accommodating portion corresponding to said spring accommodating aperture, said second rotary member being arranged near said first rotary member;
a first coil spring being arranged within said spring accommodating aperture and said spring accommodating portion, said first coil spring being supported between the circumferentially opposite ends of said spring accommodating portion and said spring accommodating aperture for transmitting a torque between said first and second rotary members;
a second coil spring being arranged within said spring accommodating aperture and said spring accommodating portion, said second coil spring being located within said first coil spring for transmitting the torque between said first and second rotary members; and
a pair of spring seats being arranged on circumferentially opposite ends of said second coil springs, said spring seats supporting the circumferentially opposite ends of said second coil spring and engaging with inner side of said second coil spring and said spring seats being circumferentially engageable with circumferentially opposite ends of said spring accommodating aperture and said spring accommodating portion,
said spring seats being supported by said circumferentially opposite ends of said spring accommodating aperture and said spring accommodating portion such that said spring seats are rotatable about an axis parallel to a rotation axis of said first and second rotary members,
said circumferentially opposite ends of said spring accommodation aperture and said spring accommodating portion each having a first support surface and a second support surface, said first support surfaces supporting the circumferentially opposite ends of said first coil spring, said second support surfaces supporting said spring seats and being arc-shaped concave portions that open in the circumferential direction, each of said spring seats having an engagement portion engageable with one of said concave portions, and
first gaps being formed circumferentially between said spring seat and both of the circumferentially opposite ends of said first coil spring.

25. A damper disk assembly comprising:
a first rotary member having at least one spring accommodating aperture;
a second rotary member having at least one spring accommodating portion corresponding to said spring accommodating aperture said second rotary member being arranged near said first rotary member;
a first coil spring being arranged within said spring accommodating aperture and said spring accommodating portion, said first coil spring being supported between the circumferentially opposite ends of said spring accommodating portion and said spring accommodation aperture for transmitting a torque between said first and second rotary members;
a second coil spring being arranged within said spring accommodation aperture and said spring accommodating portion, said second coil spring being located within said first coil spring for transmitting the torque between said first and second rotary members; and
a pair of spring seats being arranged on circumferentially opposite ends of said second coil springs, said spring seats supporting the circumferentially opposite ends of said second coil spring and engaging with inner side of said second coil spring, and said spring seats being circumferentially engageable with circumferentially opposite ends of said spring accommodating aperture and said spring accommodating portion,
said spring seats being supported by said circumferentially opposite ends of said spring accommodating aperture and said spring accommodating portion such that said spring seats are rotatable about an axis parallel to a rotation axis of said first and second rotary members, said circumferentially opposite ends of said spring accommodating aperture and said spring accommodating portion each having a first support surface and a second support surface, said first support surfaces supporting the circumferentially opposite ends of said first coil spring, said second support surfaces supporting said spring seats, and gaps being formed circumferentially between said first support surfaces and both of the circumferentially opposite ends of said second coil spring.

26. A damper disk assembly comprising:

a first rotary member having at least one spring accommodating aperture;

a second rotary member having at least one spring accommodating portion corresponding to said spring accommodating aperture, said second rotary member being arranged near said first rotary member;

a first coil spring being arranged within said spring accommodating aperture and said spring accommodating portion, said first coil spring being supported between the circumferentially opposite ends of said spring accommodating portion and said spring accommodating aperture for transmitting a torque between said first and second rotary members;

a second coil spring being arranged within said spring accommodating aperture and said spring accommodating portion, said second coil spring being located within said first coil spring for transmitting the torque between said first and second rotary members; and a pair of spring seats being arranged on circumferentially opposite ends of said second coil springs, said spring seats supporting the circumferentially opposite ends of said second coil spring and engaging with inner side of said second coil spring, and said spring seats being circumferentially encageable with circumferentially opposite ends of said spring accommodating aperture and said spring accommodating portion, said spring seats being supported by said circumferentially opposite ends of said spring accommodating aperture and said spring accommodating portion such that said spring seats are rotatable about an axis parallel to a rotation axis of said first and second rotary members, said circumferentially opposite ends of said spring accommodating aperture and said spring accommodating portion each having a first support surface and a second support surface, said first support surfaces supporting the circumferentially opposite ends of said first coil spring, said second support surfaces supporting said spring seats, said second support surfaces being arc-shaped concave portions that open in the circumferential direction, each of said spring seats having an engagement portion engageable with one of said concave portions, and gaps being formed circumferentially between said first support surfaces and both of the circumferentially opposite ends of said second coil spring.

27. The damper disk assembly according to claim 23, wherein second gaps are formed circumferentially between said first support surfaces and both of the circumferentially opposite ends of said second coil spring.

28. The damper disk assembly according to claim 21, wherein said second rotary member is formed by a pair of plate members, each of said plate members having said spring accommodating portion corresponding to said spring accommodating aperture, said pair of plate members being arranged on axially opposite sides of said first rotary member and fixedly coupled to each other.

29. The damper disk assembly according to claim 28, wherein each of said spring seats has an axial length that is longer than its radial length as measured relative to said first and second rotary members.

30. The damper disk assembly according to claim 29, wherein each of the circumferentially opposite ends of said spring accommodating aperture and said spring accommodating portions has a pair of first support surfaces and a second support surface, said pair of first support surfaces being aligned in the radial direction for contact with the circumferential ends of said first coil spring, said second support surface being formed radially between said pair of first support surfaces and supporting said spring seats.

31. The damper disk assembly according to claim 30, wherein each of said second support surfaces is an arc-shaped concave portion facing in the circumferential direction; and each of said spring seats has an engagement portion engageable with one of said concave portions.

32. The damper disk assembly according to claim 28, wherein each of said spring seats is provided at its axially opposite ends with opposition surfaces opposed to the circumferential ends of said first coil spring; and first gaps are formed circumferentially between the circumferentially opposite ends of said first coil spring and said opposition surfaces.

33. The damper disk assembly according to claim 32, wherein said opposition surface has radially opposite sides that are located circumferentially outward with respect to a radially middle portion thereof.

34. A damper disk assembly comprising:

a first rotary member having at least one spring accommodating aperture;

a second rotary member having at least one spring accommodating portion corresponding to said spring accommodating aperture, said second rotary member being arranged near said first rotary member, said second rotary member being formed by a pair of plate members, each of said plate members having said spring accommodating portion corresponding to said spring, accommodating aperture, said pair of plate members being arranged on axially opposite sides of said first rotary member and fixedly coupled to each other;

a first coil spring being arranged within said spring, accommodating aperture and said spring accommodating portion, said first coil spring being supported between the circumferentially opposite ends of said spring accommodating portion and said spring accommodating aperture for transmitting a torque between said first and second rotary members;

a second coil spring being arranged within said spring accommodating aperture and said spring accommodating portion, said second coil spring being located within said first coil spring for transmitting the torque between said first and second rotary members; and a pair of spring seats being arranged on circumferentially opposite ends of said second coil springs, said spring seats supporting the circumferentially opposite ends of said second coil spring and enlarging with inner side of said second coil spring, and said spring seats being circumferentially engageable with circumferentially opposite ends of said spring accommodating aperture and said spring accommodating portion, said spring seats being, supported by said circumferentially opposite ends of said spring accommodation aperture and said spring accommodatinm portion such that said spring seats are rotatable about an axis parallel to a rotation axis of said first and second rotary members, said circumferentially opposite ends of said spring accommodating aperture and said spring accommodation portion each having a first support surface and a second support surface, said first support surfaces supporting the circumferentially opposite ends of said first coil spring, said second support surfaces supporting said spring seats, each of said spring seats being provided at its axially opposite ends with opposition surfaces opposed to the circumferential ends of said first coil spring, first gaps being formed circumferentially between the circumferentially opposite ends of said first coil spring and said opposition surfaces, and second gaps being formed circumferentially between said first support surfaces and the circumferentially opposite ends of the second coil spring.

35. The damper disk assembly according to claim 28, wherein each of said spring seats has a restraint portion that is restrained from an axial movement when engaged with at least one of said spring accommodating aperture and said spring accommodating portion.

36. The damper disk assembly according to claim 1, wherein said elastic member has a length measured substantially parallel to a length of said coil spring, and said length of said elastic member is shorter than a distance between said spring seats in an uncompressed state of said coil spring.

* * * * *